(12) United States Patent
Chan

(10) Patent No.: US 9,967,792 B2
(45) Date of Patent: May 8, 2018

(54) COMMUNICATION SYSTEM WITH MULTI BAND GATEWAY

(71) Applicant: SPACE SYSTEMS/LORAL, LLC, Palo Alto, CA (US)

(72) Inventor: Hampton Chan, Palo Alto, CA (US)

(73) Assignee: SPACE SYSTEMS/LORAL, LLC, Palo Alto, CA (US)

( * ) Notice: Subject to any disclaimer, the term of this patent is extended or adjusted under 35 U.S.C. 154(b) by 43 days.

(21) Appl. No.: 14/659,222

(22) Filed: Mar. 16, 2015

(65) Prior Publication Data

US 2016/0277990 A1 Sep. 22, 2016

(51) Int. Cl.
| H04B 7/185 | (2006.01) |
| H04W 36/30 | (2009.01) |
| H04L 5/00 | (2006.01) |
| H04L 1/00 | (2006.01) |
| H04W 36/06 | (2009.01) |

(52) U.S. Cl.
CPC ............ *H04W 36/30* (2013.01); *H04L 5/003* (2013.01); *H04L 5/0062* (2013.01); *H04L 2001/0094* (2013.01); *H04W 36/06* (2013.01)

(58) Field of Classification Search
CPC combination set(s) only.
See application file for complete search history.

(56) References Cited

U.S. PATENT DOCUMENTS

| 4,858,229 A | 8/1989 | Rosen |
| 5,465,410 A | 11/1995 | Hiben |
| 5,708,963 A | 1/1998 | Mobley |
| 5,754,139 A | 5/1998 | Turcotte |
| 5,839,050 A | 11/1998 | Baehr |

(Continued)

FOREIGN PATENT DOCUMENTS

| EP | 0569693 | 11/1993 |
| EP | 0748065 A2 | 12/1996 |

(Continued)

OTHER PUBLICATIONS

Kawai, et al., "Study on Hybrid Multibeam Satellite Communication System with Cross-Frequency Bands," NTT Radio Communication Systems Laboratories, Kanagawa, Japan, 1998 IEEE, pp. 1752-1756.

(Continued)

*Primary Examiner* — Frank Duong
(74) *Attorney, Agent, or Firm* — Vierra Magen Marcus LLP

(57) ABSTRACT

A satellite includes a first communication path for communicating with one or more gateways using a first frequency band while communicating with a set of the user terminals using a user frequency band and a second communication path for communicating with the one or more gateways using a second frequency band while communicating with at least a subset of the user terminals using the user frequency band. The second frequency band has a lower capacity than the first frequency band. Communication between the one or more gateways and the satellite can be switched between the first communication path and the second communication path for any of a number of reasons including as part of an incremental roll-out of services, in response to degradation in link quality or other reason.

25 Claims, 15 Drawing Sheets

(56) References Cited

U.S. PATENT DOCUMENTS

| | | |
|---|---|---|
| 5,991,622 A | 11/1999 | Henry, Jr. |
| 6,011,951 A | 1/2000 | King |
| 6,047,171 A | 4/2000 | Khayrallah |
| 6,169,513 B1 | 1/2001 | Cohen |
| 6,236,834 B1 | 5/2001 | Poskett |
| 6,498,937 B1 | 12/2002 | Smith |
| 6,678,520 B1 | 1/2004 | Wang |
| 6,763,006 B1 | 7/2004 | Lockett |
| 6,813,476 B1 | 11/2004 | Brooker |
| 6,847,817 B2 | 1/2005 | Hadinger |
| 6,866,231 B2 | 3/2005 | Higgins |
| 6,898,428 B2 | 5/2005 | Thorburn |
| 7,027,786 B1 | 4/2006 | Smith |
| 7,136,620 B2 | 11/2006 | Wang |
| 7,289,062 B2 | 10/2007 | Hudson |
| 7,398,050 B2 | 7/2008 | Walker |
| 7,526,249 B2 | 4/2009 | Waltman |
| 7,599,657 B2 | 10/2009 | Schiff |
| 7,773,942 B2 | 8/2010 | Hudson |
| 7,869,759 B2 * | 1/2011 | Pateros ............... H04B 7/18515 455/12.1 |
| 8,068,827 B2 | 11/2011 | Miller |
| 8,149,761 B2 | 4/2012 | Hudson |
| 8,213,929 B2 | 7/2012 | Miller |
| 8,385,817 B2 | 2/2013 | Dankberg |
| 8,548,377 B2 * | 10/2013 | Dankberg ........... H04B 7/18543 370/316 |
| 8,711,758 B2 | 4/2014 | Hudson |
| 9,236,934 B1 * | 1/2016 | Hudson ............... H04B 7/18513 |
| 2003/0134592 A1 | 7/2003 | Franzen |
| 2004/0066347 A1 * | 4/2004 | Schiff ................ H04B 7/18534 343/776 |
| 2004/0087271 A1 | 5/2004 | Chang |
| 2004/0110467 A1 | 6/2004 | Wang |
| 2004/0224633 A1 | 11/2004 | Coromina |
| 2005/0277382 A1 | 12/2005 | Walker |
| 2007/0037512 A1 | 2/2007 | Godwin |
| 2009/0232046 A1 * | 9/2009 | Fenech .............. H04B 7/18532 370/319 |
| 2012/0094593 A1 * | 4/2012 | Burr ..................... H04B 7/2041 455/12.1 |
| 2012/0127921 A1 | 5/2012 | Laufer |
| 2015/0188623 A1 * | 7/2015 | Angeletti ........... H04B 7/18515 455/13.3 |

FOREIGN PATENT DOCUMENTS

| | | |
|---|---|---|
| EP | 0748065 A3 | 1/1998 |
| EP | 0961420 A1 | 12/1999 |
| RU | 2137304 | 9/1999 |
| RU | 2153226 | 7/2000 |
| WO | WO 98/14026 | 4/1998 |
| WO | WO 99/18678 | 4/1999 |
| WO | WO 2004/002016 A2 | 12/2003 |
| WO | WO 2004/002016 A3 | 12/2003 |
| WO | WO 2005/067367 | 7/2005 |
| WO | WO 2007/056270 | 5/2007 |
| WO | WO 2009/049090 A1 | 4/2009 |

OTHER PUBLICATIONS

Skinnemoen, "Gateway Diversity in KA-Band Systems," Nera SatCom, Billingstad, Norway, 8 pages.

* cited by examiner

*Figure 2A* Downlinks
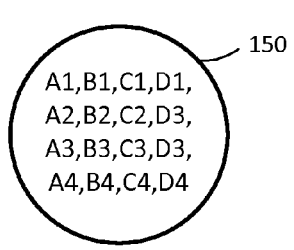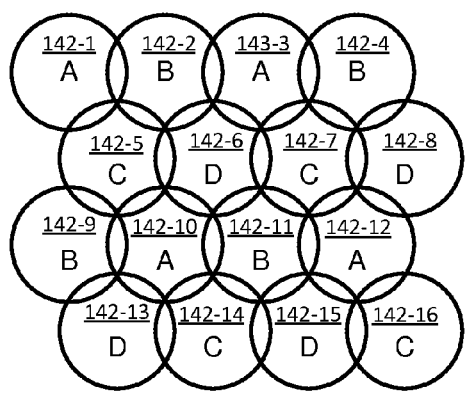
*Figure 2B* Downlinks
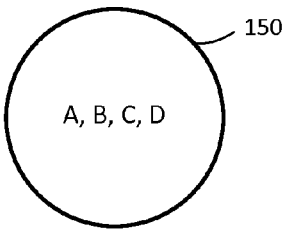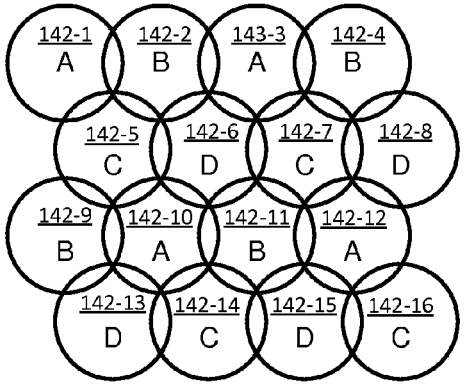
*Figure 2C* Downlinks
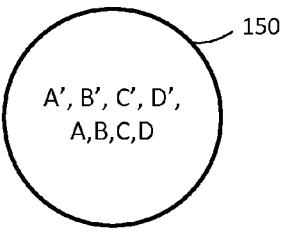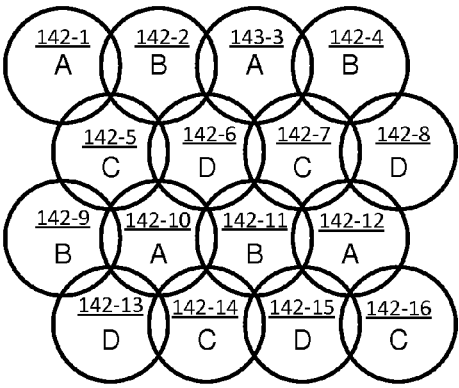

Forward Downlink

Return Uplink

Return Downlink

Forward Uplink

Return Downlink

Forward Uplink

Return Downlink

Forward Uplink

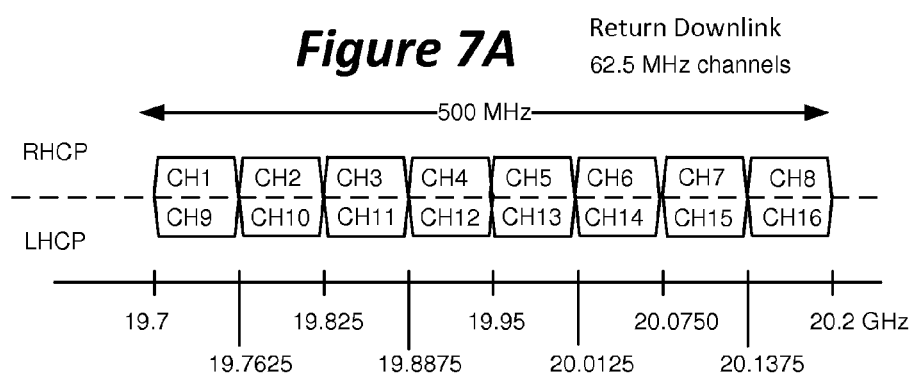
Figure 7A  Return Downlink 62.5 MHz channels
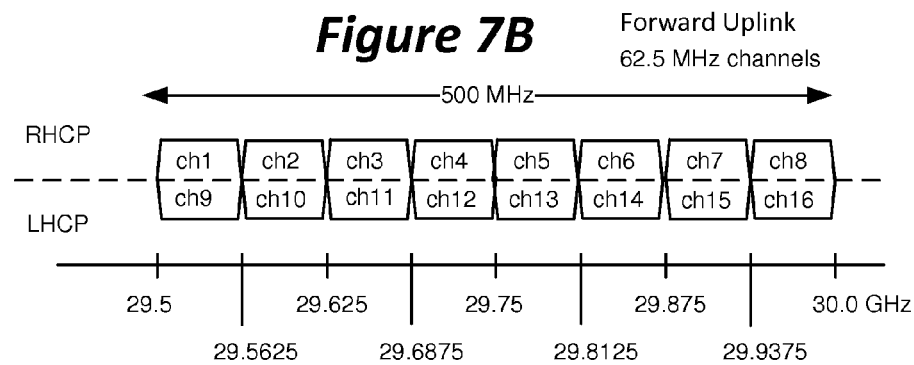
Figure 7B  Forward Uplink 62.5 MHz channels

COMMUNICATION SYSTEM WITH MULTI BAND GATEWAY

BACKGROUND

Field

The present disclosure relates to technology for wireless communication systems.

Description of the Related Art

Wireless communication systems typically include a communication platform such as a dedicated terrestrial antenna, airborne platform, or communications spacecraft (e.g., a satellite). Such platforms typically operate within regulations that allocate at least one operating frequency bandwidth for a particular set of communications. A growing market exists for provision of high data rate wireless communication services to consumers and businesses. To meet the demand, systems are being designed with increased capacities. For example, using higher frequencies for wireless communication allows for wider bands and, therefore, greater system capacity. However, with higher frequencies it may be harder to close the link between the communication platform and the ground terminal.

BRIEF DESCRIPTION OF THE DRAWINGS

FIGS. 2A, 2B and 2C are examples of partial beam maps describing the placement of gateways and user beams, and examples of frequency reuse plans.

FIG. 4A-1 is a diagram describing frequency assignments for the return downlink of one example embodiment.

FIG. 4A-2 is a diagram describing frequency assignments for the forward uplink of one example embodiment.

FIG. 4B-1 is a diagram describing frequency assignments for the return downlink of one example embodiment.

FIG. 4B-2 is a diagram describing frequency assignments for the forward uplink of one example embodiment.

FIG. 4C-1 is a diagram describing frequency assignments for the return downlink of one example embodiment.

FIG. 4C-2 is a diagram describing frequency assignments for the forward uplink of one example embodiment.

FIG. 7A is a diagram describing frequency assignments for the return downlink of one example embodiment.

FIG. 7B is a diagram describing frequency assignments for the forward uplink of one example embodiment.

DETAILED DESCRIPTION

A communication system is proposed that includes communicating with one or more gateways using a first frequency band while communicating with a set of the user terminals using a user frequency band and also the ability to communicate with the one or more gateways using a second frequency band while communicating with at least a subset of the user terminals using the user frequency band. The system can switch between first frequency band and the second frequency band.

One embodiment includes a communication system that takes advantage of a higher frequency band (with its greater bandwidth), but has a fallback option to a lower frequency band (with its lower capacity, but higher reliability). Thus, the proposed system can be thought of as a hybrid system that is able to communicate in both a higher frequency band (higher capacity frequency band) and a lower frequency band (lower capacity frequency band).

For example, a communication platform, such as a satellite, includes a first communication path for communicating with one or more gateways using a first frequency band while communicating with a set of the user terminals using a user frequency band in order to send information between the one or more gateways and the set of user terminals. The satellite includes a second communication path for communicating with the one or more gateways using a second frequency band while communicating with at least the subset of the user terminals using the user frequency band in order to send information between the one or more gateways and the subset of the user terminals. The second frequency band has a lower capacity than the first frequency band. Communication between the one or more gateways and the satellite can be switched between the first communication path and the second communication path for any of a number of reasons, including as part of an incremental roll-out of services, in response to degradation in link quality or other reason.

Figure 1:
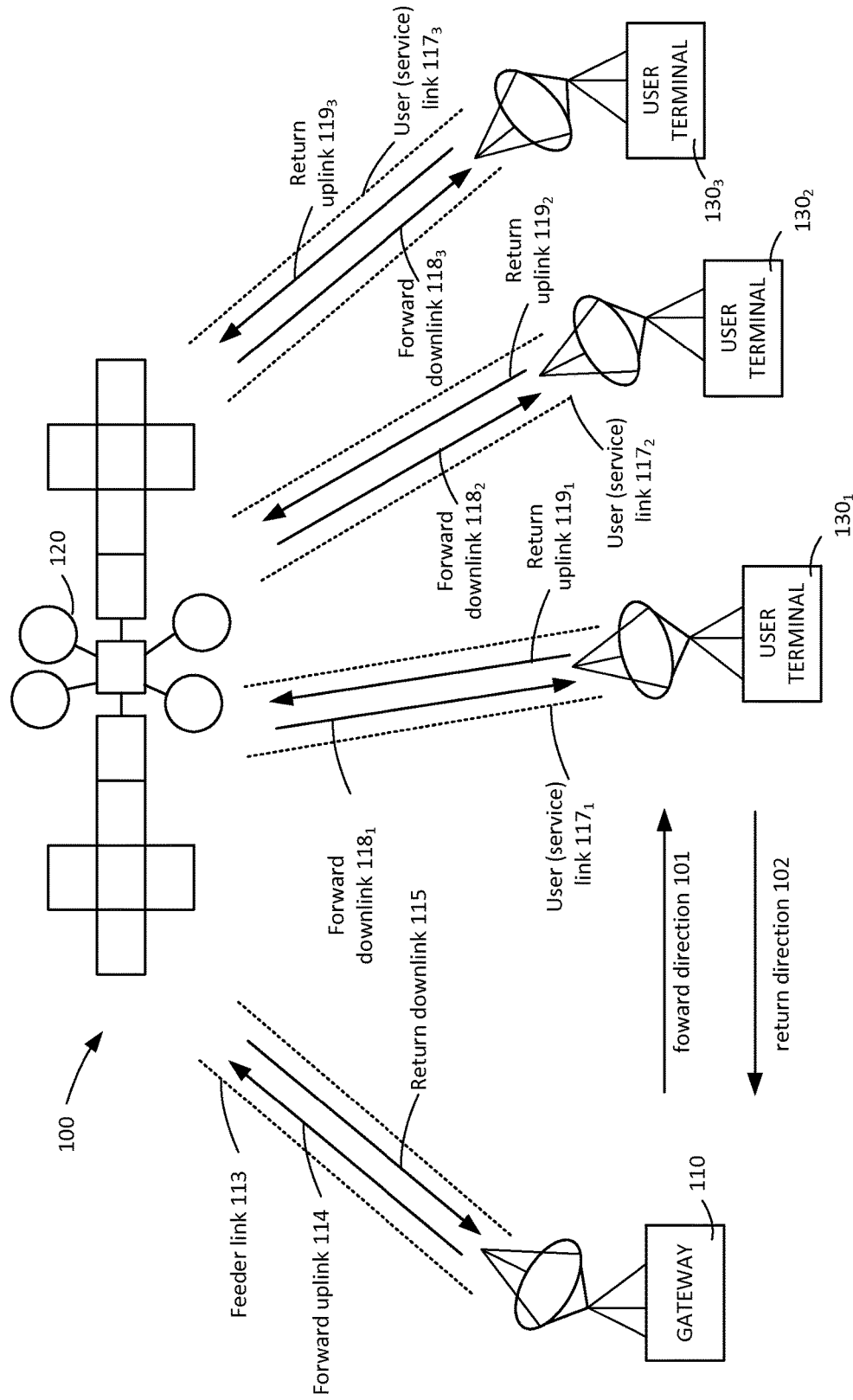
FIG. 1 is a block diagram describing one embodiment of a satellite communications system.

FIG. 1 depicts a simplified diagram of a portion of a wireless communications system 100 in which embodiments of the presently disclosed technology may be practiced. In the example of FIG. 1, a communications platform according to one embodiment includes a satellite 120 forming part of a wireless communications network 100. Other embodiments can utilize a communications platform other than a satellite, such as a cellular tower, balloon, drone, terrestrial tower, etc. Satellite 120 may be located, for example, at a geostationary or non-geostationary orbital location. Satellite 120 can also be a Low Earth Orbit satellite or interplanetary craft. Satellite 120 may be communicatively coupled, by at least one feeder link, to at least one gateway 110 and, by at least one user link to a plurality of user terminals 130, via an antenna system. The term user terminals 130 may be used to refer to a single user terminal or multiple user terminals such as user terminals 130₁, 130₂, 130₃ collectively. A user terminal is adapted for communication with a wireless communication platform such as satellite 120. User terminals may include fixed and mobile user terminals including, but not limited to, a cellular telephone, wireless handset, a wireless modem, a date transceiver, a paging or position determination receive, mobile radio-telephone or computing device. A user terminal may be hand-held, portable (including vehicle-mounted installations for cars, trucks, boats, trains, planes, etc.) or fixed as desired. A user terminal may be referred to as a wireless communication device, a mobile station, a mobile wireless unit, a user, a user, or a mobile.

The communication system of FIG. 1 includes a forward direction 101 and a return direction 102. The forward direction 101 is from gateway 110 to the user terminals $130_1$, $130_2$, $130_3$ via satellite 120. The return direction 102 is from user terminals $130_1$, $130_2$, $130_3$ to gateway 110 via satellite 120.

The at least one gateway 110 may be coupled to a network such as, for example, the Internet, terrestrial public switched telephone network, mobile telephone network, a LAN, a WAN, etc. Gateway 110 and satellite 110 communicate over a feeder link 113 (also known as a feeder beam or gateway beam), which has both a forward uplink 114 and a return downlink 115. The uplink 114 is referred to as the forward uplink because it is part of the communication path in the forward direction 101. Similarly, downlink 115 is referred to as the return downlink because it is part of the communication path in the return direction 102. Feeder link 113 may operate for example, in an assigned or allocated frequency band (e.g, between 17 and 80 GHz). Although a single gateway is shown, typical implementations will include many gateways, such as five, ten, or more. Each gateway may utilize its own gateway beam, although more than one gateway can be positioned within a beam. Each gateway provides an interface to the Internet, other network or other resource.

User terminals $130_1$, $130_2$, $130_3$ and the satellite 120 communicate over user links 117 ($117_1$, $117_2$, $117_3$) that have both a forward downlink 118 ($118_1$, $118_2$, $118_3$) and a return uplink 119 ($119_1$, $119_2$, $119_3$). Three user terminals with three user links $117_1$-$117_3$ are depicted by way of example. Typical implementations will include many user terminals. Moreover, many user terminals may be located within the geographic coverage area of a single spot beam referred to as a user beam or service beam. Many user beams may be included in various implementations. For example, fifty, sixty or more (or less) user beams may be used to generate a service region. User link 117 may operate in an assigned frequency band that is different than or the same as the frequency band assigned to feeder link 113. For example, the user links may operate in the same assigned frequency band as the gateway, such as when the gateway is located in a coverage area spatially separated from the coverage areas of the user beam or user beams for which the frequency is re-used. In other examples, one or more gateways may be located in the same coverage area as a user beam coverage area and different frequency bands are used.

If the communication system of FIG. 1 is operating to provide access to a network (e.g., the Internet) for user terminals, one example of the communication operation may be as follows. A user terminal contacts a host on the network by sending a communication to the gateway 110 via satellite 120. The gateway relays the communication to the host via the network. The host sends its reply to the user terminal via the gateway 110, with gateway 100 relaying the reply to the user terminal via satellite 120.

Figure 1A:
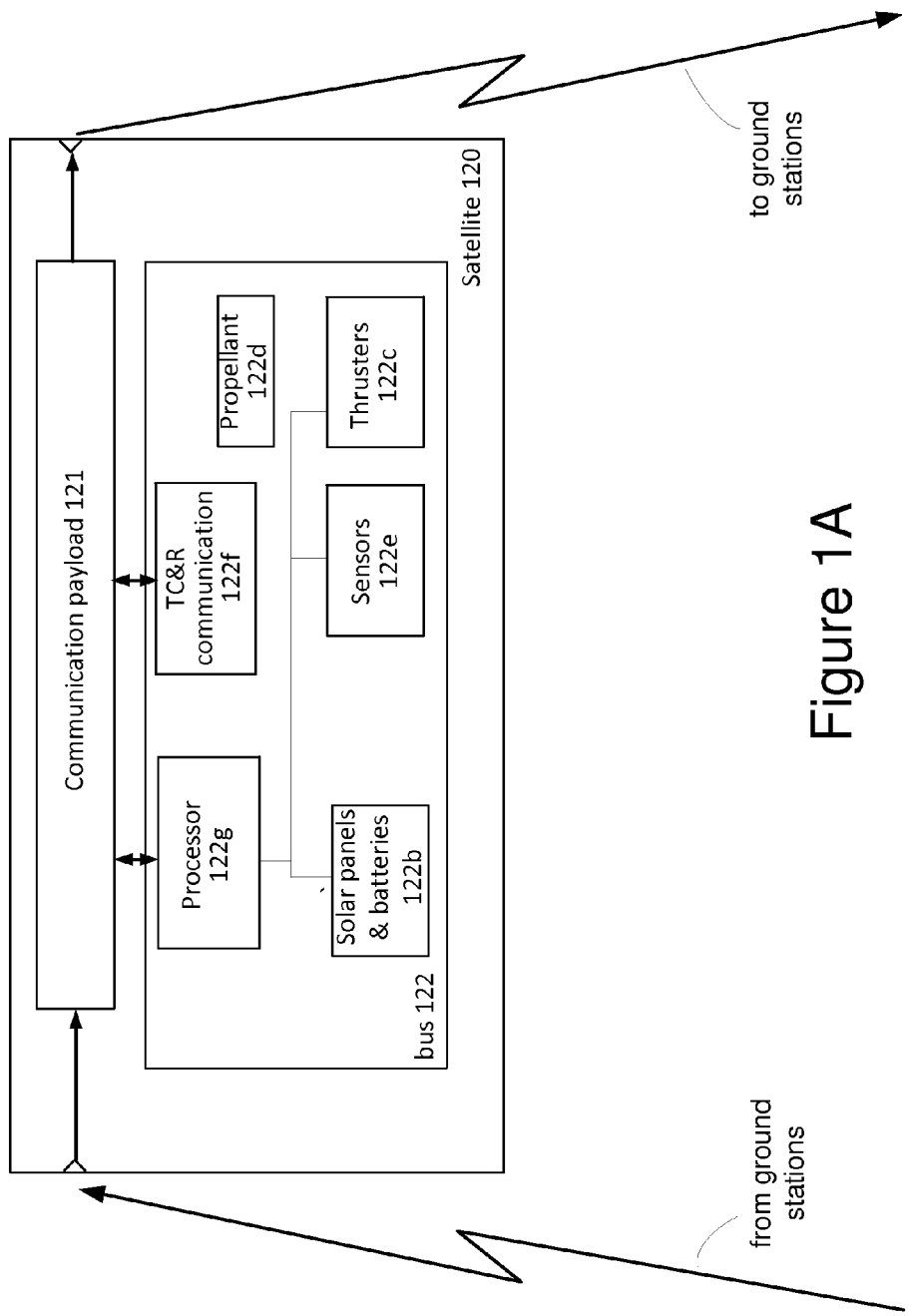
FIG. 1A is a block diagram of a satellite.

FIG. 1A is a block diagram providing more details of the components of satellite 120. In one embodiment, satellite 120 includes a bus 122 and a communication payload 121 carried by the bus 120. Some embodiments of satellite 120 may include more than one payload. The payload provides the functionality of the communication system described herein.

In general, the bus 122 is the spacecraft that houses the payload. For example, the bus includes solar panels and one or more batteries 122*b*, thrusters 122*c*, propellant 122*d*, sensors 122*e*, T, C & R communication and processing equipment 122*f*, and processor 122*g*. Solar panels and batteries 122*b* are used to provide power to satellite 120. Thrusters 122*c* are used for changing the position or orientation of satellite 120 while in space. Propellant 122*d* is for the thrusters. Sensors 122*e* are used to determine the position and orientation of satellite 120. T, C & R communication and processing equipment 122*f*, includes communication and processing equipment for telemetry, commands from the ground to the satellite and ranging to operate the satellite. Processor 122*g* is used to control and operate satellite 120. An operator on the ground can control satellite 120 by sending commands via T, C & R communication and processing equipment 122*f* to be executed by system processor 122*g*. Some embodiments include a Network Control Center that wirelessly communicates with T, C & R communication and processing equipment 122*f* to send command and control satellite 120. In one embodiment, processor 122*g* and T, C & R communication and processing equipment 122*f* are in communication with the communication payload 121.

In one embodiment, the communication payload 121 includes an antenna system that provides a set of beams comprising a beam pattern used to receive wireless signals from ground stations and to send wireless signals to ground stations. In one example, an entire service region is covered using one beam. In another example, however, the antenna system provides a beam pattern that includes multiple spot beams, with each spot beam covering a portion of the service region. The portion of the service region covered by a spot beam is referred to as a cell. The individual spot beams (user beams) divide an overall service region into a number of cells. For example, U.S. Pat. No. 7,787,819 describes a pattern of 135 spot beams covering the continental United States (CONUS), Hawaii, Alaska, and Puerto Rico. It is noted that a service region may be defined in any manner to cover any desired geographic location. In one embodiment, the antenna system includes a phased array antenna, a direct radiating antenna, or a multi-feed fed reflector.

Dividing the overall service region into a plurality of smaller cells permits frequency reuse, thereby substantially increasing the bandwidth utilization efficiency. In some examples of frequency reuse, a total bandwidth allocated to the downlink is divided into separate non-overlapping blocks for the forward downlink 118 and the return downlink 115. Similarly, the total bandwidth allocated to the uplink is divided into separate non-overlapping blocks for the forward uplink 114 and the return uplink 119.

In other examples, some or all of the allocated bandwidth for user beams is reused by the gateway(s) 110, thereby providing for simultaneous operation of at least a portion of the feeder link 113 and a portion of the user link 117 at common frequencies. More specifically, forward uplink 114 and return uplink 119 may reuse the same frequency and forward downlink 118 and return downlink 115 may reuse the same frequency. Simultaneous operation of the feeder link 113 and the user link 117 at common frequencies means that the gateway(s) 110 may reuse any part of the total bandwidth allocated to the user beams. This may be accomplished in various ways known in the art, such as by using spatial isolation, time domain isolation, code isolation, etc.

Figure 3A:
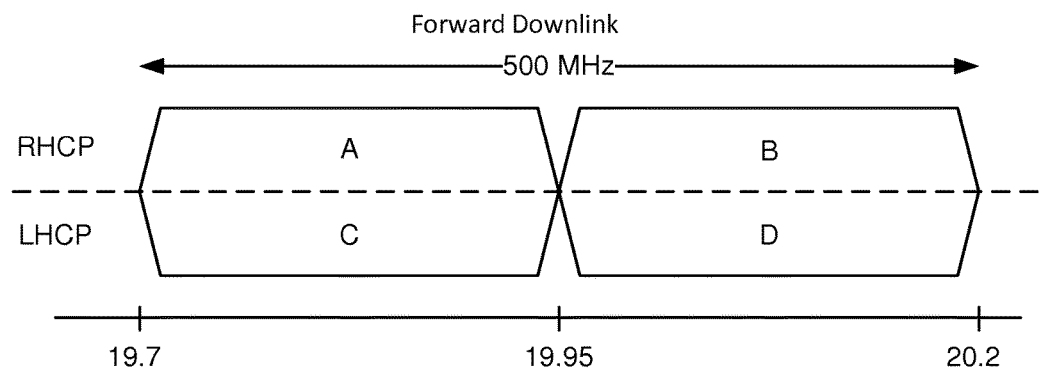
FIG. 3A is a diagram describing frequency assignments for the forward downlink of one example embodiment.

FIG. 2A depicts a portion of a beam pattern. A cluster of spot beams, user beams, is depicted that includes spot beams that are adjacent and at least partially overlapping with at least one other spot beam in the cluster. The provided example show a color re-use technique with four dedicated color assignments for user beams. The colors in one specific example may correspond to the color assignments for unique combinations of frequency band and antenna polarization as shown in FIG. 3A, but other frequencies, polarizations, and divisions may be used. A small number of spot beams and corresponding coverage areas are shown by way of example, but it will be appreciated that the concepts may be extended to any number of spot beams or used with fewer spot beams. While an example is described with respect to forward downlink signals in user beams from a satellite to user terminals, the concepts are equally applicable to return uplink signals as well.

The spot beams of FIG. 2A are roughly arranged into four rows. A first row includes spot beams 142-1, 142-2, 143-2 and 142-4; a second row includes spot beams 142-5, 142-6, 142-7 and 142-8; a third row includes spot beams 142-9, 142-10, 1432-11 and 142-12; and a fourth row includes spot beams 142-13, 142-14, 142-15 and 142-16. Each spot beam is assigned a dedicated color, where color is defined as a combination of frequency band and polarization. The spot beams in the first row alternate dedicated downlink color assignments 'A' and 'B,' beginning with an 'A' color assignment for spot beam 142-1 and ending with a 'B' color assignment for spot beam 142-4. The spot beams in the second row alternate dedicated color assignments 'C' and 'D,' beginning with a 'C' color assignment for spot beam 142-5 and ending with a 'D' color assignment for spot beam 142-8. The spot beams in the third row alternate dedicated color assignments 'A' and 13,' beginning with an 'A' color assignment for spot beam 142-9 and ending with a 'B' color assignment for spot beam 142-12. The spot beams in the fourth row alternate dedicated color assignments 'C' and 'D,' beginning with a 'C' color assignment for spot beam 142-13 and ending with a 'D' color assignment for spot beam 142-16. The spot beans 142-1 through 142-16 are analogous to user/service links 117 of FIG. 1.

FIG. 2A also depicts a spot beam 150 for communicating with the gateway. Sport beam 150 is analogous to feeder link 113 of FIG. 1, and can be referred to as a feeder beam or gateway beam. FIG. 2A shows that satellite 120 communicates with gateway 110 in spot beam 150 (also known as feeder beam 150) using the following colors (frequency band+polarization): A1, B1, C1, D1, A2, B2, C2, D2, A3, B3, C3, D3, A4, B4, C4, and D4. In this embodiment, the feeder beam 150 uses sixteen colors while each user beam (142-1 to 142-16) uses one color. In one embodiment, each color of FIG. 2A includes 250 MHz of spectrum and feeder beam 150 is used to communicate with the user terminals of user beams 142-1 to 142-16.

In order to operate a satellite communication system, or other wireless communication system (as the technology described herein is not limited to satellite communication systems), the operator (or other entity) typically must request permission from an appropriate governmental authority to utilize preselected frequency bands. For example, some satellites are provided with permission to operate in the Ka band, which includes uplink frequencies of 29.5-30.0 GHz and downlink frequencies of 19.7-20.2 GHz. Other frequency bands can also be used. Higher frequency bands have more capacity (bandwidth) to carry data. Therefore, it is desirable to operate at higher frequencies. For example, the V band can be used for uplinks at approximately 50 GHz and the Q band can be used for downlinks are approximately 37 GHz. A satellite communication system may be allocated up to approximately 5 GHz in each of the V and Q bands. Because the V and Q bands have higher capacity than the Ka band, the Ka band will be referred to as a low capacity frequency band and the Q/V bands will be referred to as high capacity frequency bands. Other low capacity frequency bands also exist (e.g., Ku band, LMDS band, NGSO band). Other high capacity frequency bands also exist (e.g., optical band, W band and M band). The technology described herein is not limited to any particular frequency band.

Figure 3B:
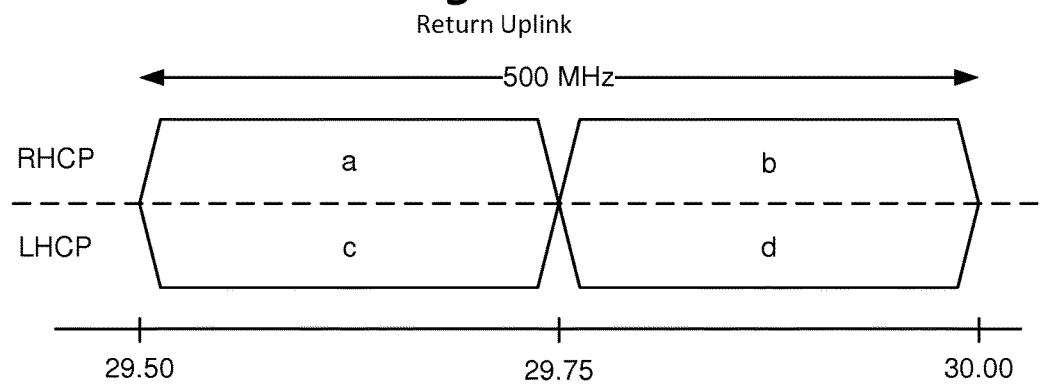
FIG. 3B is a diagram describing frequency assignments for the return uplink of one example embodiment.

In one embodiment, in order to achieve enough capacity in the feeder links to have one gateway service user terminals in sixteen (or more or less) user beams, communication between the satellite will be in high capacity frequency bands such as Q/V bands, while communication between the satellite and the user terminals will be in a low capacity frequency band such as Ka band. FIGS. 3A and 3B show an example frequency plan for the user beams 142-1 to 142-16 of FIG. 2A for such an embodiment. FIG. 3A shows the colors A, B, C and D for the user beam downlinks (forward downlink) and FIG. 3B shows the colors a, b, c and d for the user beam uplinks (return uplink). In this example, color 'a' represents a first sub-band (29.50 GHz-29.75 GHz) of an allocated uplink frequency band (29.50 GHz-30.00 GHz) with a right-hand circular polarization (RHCP). Color 'b' represents a second sub-band (29.75 GHz-30.00 GHz) of the allocated uplink frequency band with RHCP. Color 'c' represents the first sub-band of the allocated uplink frequency band with a left-hand circular polarization (LHCP). Color 'd' represents the second sub-band of the allocated uplink frequency band with LHCP. Similarly for the downlink, color 'A' represents a first sub-band (19.70 GHz-19.95 GHz) of the allocated downlink frequency band (19.70 GHz-20.20 GHz) with RHCP. Color 'B' represents a second sub-band (19.95 GHz-20.20 GHz) of the allocated downlink frequency band with RHCP. Color 'C' represents the first sub-band of the allocated downlink frequency band with LHCP. Color 'D' represents the second sub-band of the allocated downlink frequency band with LHCP.

Figures 1, 4A:
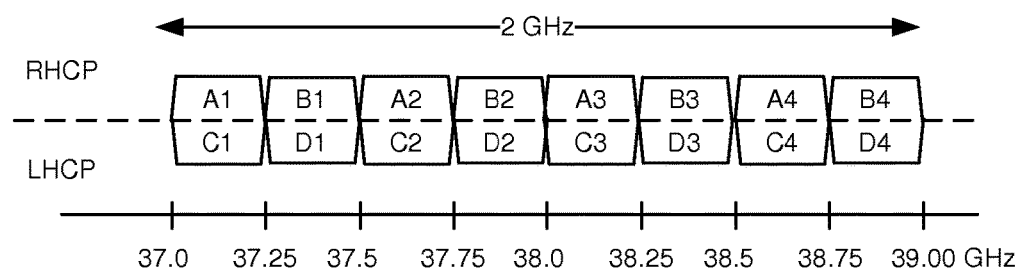
Figures 2, 4A:
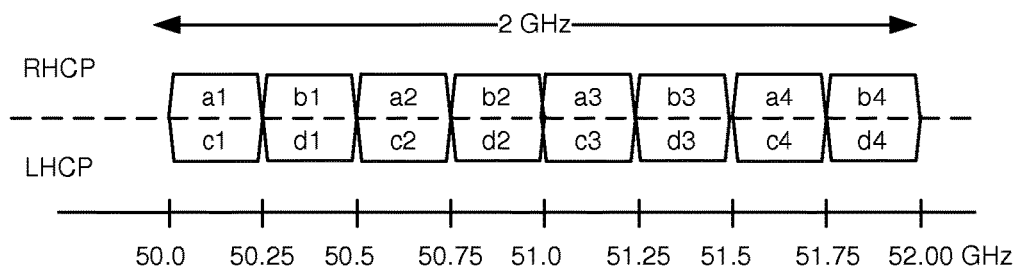

FIGS. 4A-1 and 4A-2 show an example frequency plan for the feeder beams (such as feeder beam 150) for one embodiment where communication between the satellite and the gateway will be in high capacity frequency bands such as Q/V bands, while communication between the satellite and the user terminals will be in a low capacity frequency band such as Ka band. FIG. 4A-1 shows the colors A1, B1, C1, D1, A2, B2, C2, D2, A3, B3, C3, D3, A4, B4, C4, and D4 in the Q band for the feeder beam downlinks (return downlink). FIG. 4A-2 shows the colors a1, b1, c1, d1, a2, b2, c2, d2, a3, b3, c3, d3, a4, b4, c4 and d4 in the V band for the feeder beam uplinks (forward uplink). The frequency plan of FIGS. 4A-1 and 4A-2 van be used for the beam pattern of FIG. 2A.

In this example, color A1 represents a sub-band 37.0 GHz-37.25 GHz with a right-hand circular polarization (RHCP). Color B1 represents a sub-band 37.25 GHz-37.5 GHz with a right-hand circular polarization (RHCP). Color A2 represents a sub-band 37.5 GHz-37.75 GHz with a right-hand circular polarization (RHCP). Color B2 represents a sub-band 37.75 GHz-38.0 GHz with a right-hand circular polarization (RHCP). Color A3 represents a sub-band 38.0 GHz-38.25 GHz with a right-hand circular polarization (RHCP). Color B3 represents a sub-band 38.25

GHz-38.5 GHz with a right-hand circular polarization (RHCP). Color A4 represents a sub-band 38.5 GHz-38.75 GHz with a right-hand circular polarization (RHCP). Color B4 represents a sub-band 38.75 GHz-39.0 GHz with a right-hand circular polarization (RHCP). Color C1 represents a sub-band 37.0 GHz-37.25 GHz with a left-hand circular polarization (LHCP). Color D1 represents a sub-band 37.25 GHz-37.5 GHz with a left-hand circular polarization (LHCP). Color C2 represents a sub-band 37.5 GHz-37.75 GHz with a left-hand circular polarization (LHCP). Color D2 represents a sub-band 37.75 GHz-38.0 GHz with a left-hand circular polarization (LHCP). Color C3 represents a sub-band 38.0 GHz-38.25 GHz with a left-hand circular polarization (LHCP). Color D3 represents a sub-band 38.25 GHz-38.5 GHz with a left-hand circular polarization (LHCP). Color C4 represents a sub-band 38.5 GHz-38.75 GHz with a left-hand circular polarization (LHCP). Color D4 represents a sub-band 38.75 GHz-39.0 GHz with a left-hand circular polarization (LHCP).

In this example, color a1 represents a sub-band 50.0 GHz-50.25 GHz with a right-hand circular polarization (RHCP). Color b1 represents a sub-band 50.25 GHz-50.5 GHz with a right-hand circular polarization (RHCP). Color a2 represents a sub-band 50.5 GHz-50.75 GHz with a right-hand circular polarization (RHCP). Color b2 represents a sub-band 50.75 GHz-51.0 GHz with a right-hand circular polarization (RHCP). Color a3 represents a sub-band 51.0 GHz-51.25 GHz with a right-hand circular polarization (RHCP). Color b3 represents a sub-band 51.25 GHz-51.5 GHz with a right-hand circular polarization (RHCP). Color a4 represents a sub-band 51.5 GHz-51.75 GHz with a right-hand circular polarization (RHCP). Color b4 represents a sub-band 51.75 GHz-39.0 GHz with a right-hand circular polarization (RHCP). Color c1 represents a sub-band 50.0 GHz-50.25 GHz with a left-hand circular polarization (LHCP). Color d1 represents a sub-band 50.25 GHz-50.5 GHz with a left-hand circular polarization (LHCP). Color c2 represents a sub-band 50.5 GHz-50.75 GHz with a left-hand circular polarization (LHCP). Color d2 represents a sub-band 50.75 GHz-51.0 GHz with a left-hand circular polarization (LHCP). Color c3 represents a sub-band 51.0 GHz-51.25 GHz with a left-hand circular polarization (LHCP). Color d3 represents a sub-band 51.25 GHz-51.5 GHz with a left-hand circular polarization (LHCP). Color c4 represents a sub-band 51.5 GHz-51.75 GHz with a left-hand circular polarization (LHCP). Color d4 represents a sub-band 51.75 GHz-52.0 GHz with a left-hand circular polarization (LHCP). Note that the exact frequencies and ranges of FIGS. 4A-1 and 4A-2 are examples only, and other frequencies or bands can also be used.

In one embodiment, since the feeder beam of sixteen colors of 250 MHz each communicates with sixteen user beams of 250 MHz each, each color of the feeder beam is dedicated for communication for one user beam. One implementations includes bands A1, A2, A3 and A4 being used to communicate with user beams of color A. For example, A1 can be used to communicate with 142-1, A2 can be used to communicate with 143-3, A3 can be used to communicate with 142-10 and A4 can be used to communicate with 142-12. Similarly, B1 can be used to communicate with 142-2, B2 can be used to communicate with 143-4, B3 can be used to communicate with 142-9, A4 can be used to communicate with 142-11, C1 can be used to communicate with 142-5, C2 can be used to communicate with 143-7, C3 can be used to communicate with 142-14, C4 can be used to communicate with 142-16, D1 can be used to communicate with 142-6, D2 can be used to communicate with 143-8, D3 can be used to communicate with 142-13, D4 can be used to communicate with 142-15.

Using the V/Q bands provides a gateway with more bandwidth; therefore, a gateway can service more user beams. Since a gateway can service more user beams, less gateways are needed than if the communication between the satellite and the gateway used a low capacity frequency band. Although using the frequency bands with higher frequencies and higher capacity provides the system with more bandwidth, it can be more difficult to close the link (establish and/or maintain reliable communication) with the higher frequencies. For example, a condition called rain fade exists when heavy rains attenuate a wireless signal. Higher frequencies are also more susceptible to rain fade. In situations where the system is having difficulty closing the link to a gateway, it is proposed to switch the communication to that gateway (and, in some cases, other gateways) to a low capacity frequency band (e.g., Ka band) that is less susceptible to rain fade or otherwise easier to close the link.

For example, communication between gateway 110 and satellite 120 may be performed using V and Q bands. If the system begins to have trouble closing the link to gateway 110 (e.g., because of rain fade), the system can switch to communication between gateway 110 and satellite 120 being performed using the Ka band. In one set of embodiments, when the system switches the band for communication with the gateway, the system does not switch the band for communication between the satellite and the user terminals.

FIG. 2B depicts the same portion of the beam pattern depicted in FIG. 2A. The colors assigned to the user beams of FIG. 2B are the same as in FIG. 2A, and the frequency plan of the colors is that of FIGS. 3A and 3B. However, while FIG. 2A shows the color assignment when communication between gateway 110 and satellite 120 is performed using the high capacity frequency band, FIG. 2B shows the color assignment when communication between gateway 110 and satellite 120 is performed using the low capacity frequency band. In this example, rather than using 16 colors of 250 MHz each, feeder beam 150 only uses 4 colors of 250 MHz each. Thus the capacity of the feeder beam is significantly reduced. As such, the capacity of the aggregate user beams 142-1 to 142-16 must also be reduced. In one example, the four colors of the feeder beam 150 can be time multiplexed with the sixteen user beams so that each user beams gets to operate ¼ of the time. Alternatively, the four colors of the feeder beam can be used to service only four user beams, so that twelve user beams (and the user terminals in those beams) are ignored.

Figures 1, 4B:
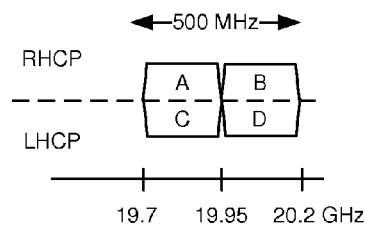
Figures 2, 4B:
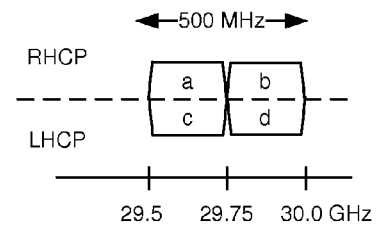

FIGS. 4B-1 and 4B-2 show an example frequency plan for the feeder beams (such as feeder beam 150) for one embodiment where communication between the satellite and the gateway will be in a low capacity frequency bands such as the Ka band, with communication between the satellite and the user terminals also in the same or another low capacity frequency band. The frequency plan of FIGS. 4AB-1 and 4B-2 applies to the beam pattern of FIG. 2B. FIG. 4B-1 shows the same colors A, B, C and D as FIG. 3A, but used for the feeder beam downlinks (return downlink). FIG. 4B-2 shows the same colors a, b, c, and d as FIG. 3B, but used for the feeder beam uplinks (forward uplink).

In one example, when the weather is good, the system will operate based on the frequency assignments of FIGS. 2A, 3A, 3B, 4A-1 and 4A-2. If the system experiences rain fade or otherwise is having problems closing the link to the gateway, then the system will communicate using the frequency assignments of FIGS. 2B, 3A, 3B, 4B-1 and 4B-2.

In some embodiments of such an implementation, only four of the user beams will be serviced by the gateway. In one alternative, the four colors of the feeder beam 150 can be time multiplexed with the sixteen user beams so that each user beams gets to operate ¼ of the time. In another embodiment that includes servicing more user beams when the gateway is communicating in the lower capacity frequency band, the system can be designed for the gateway to communicate using multiple lower capacity frequency bands, such as depicted in FIG. 2C.

FIG. 2C depicts the same portion of the beam pattern depicted in FIG. 2A. The colors assigned to the user beams of FIG. 2C are the same as in FIG. 2A, and the frequency plan of the colors is that of FIGS. 3A and 3B. However, while FIG. 2A shows the color assignment when communication between gateway 110 and satellite 120 is performed using the high capacity frequency band, FIG. 2C shows the color assignment when communication between gateway 110 and satellite 120 is performed using two low capacity frequency bands. In this example, rather than using 16 colors of 250 MHz each, feeder beam 150 only uses eight colors (A', B', C', D', A, B, C, D) of 250 MHz each. Thus the capacity of the feeder beam is reduced, but reduced less than in FIG. 2B. As such, the capacity of the aggregate user beams 142-1 to 142-16 must also be reduced. In one example, the eight colors of the feeder beam 150 can be time multiplexed with the sixteen user beams so that each user beams gets to operate ½ of the time. Alternatively, the eight colors of the feeder beam can be used to service only eight user beams, so that eight user beams (and the user terminals in those beams) are ignored.

Figures 1, 4C:
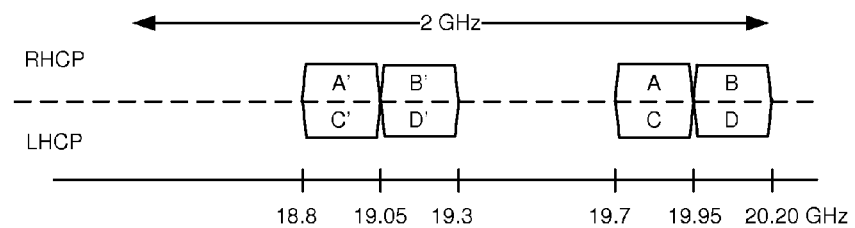
Figures 2, 4C:
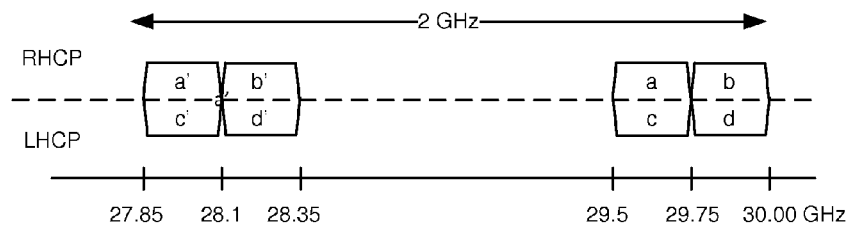

FIGS. 4C-1 and 4C-2 show an example frequency plan for the feeder beams (such as feeder beam 150) for one embodiment where communication between the satellite and the gateway will be in low capacity frequency bands such as Ka bands, NGSO bands and LMDS bands, with communication between the satellite and the user terminals also in the Ka band or another low capacity frequency band. The frequency plan of FIGS. 4C-1 and 4C-2 applies to the beam pattern of FIG. 2C. FIG. 4C1 shows the same colors A, B, C and D as FIG. 3A, but used for the feeder beam downlinks (return downlink). FIG. 4C1 also shows A', B', C' and D' in the band of 18.8-19.3 GHz, corresponding the low capacity NGSO frequency band. FIG. 4C-2 shows the same colors a, b, c, and d as FIG. 3B, but used for the feeder beam uplinks (forward uplink). FIG. 4C-2 also shows the colors a', b', c', and d' in the band of 27.85-28.35 GHz, corresponding to the LMDS band.

In one example, when the weather is good, the system will operate based on the frequency assignments of FIGS. 2A, 3A, 3B, 4A-1 and 4A-2. If the system experiences rain fade or otherwise is having problems closing the link to the gateway, then the system will operate based on the frequency assignments of FIGS. 2C, 3A, 3B, 4C-1 and 4C-2. In some embodiments of such an implementation, only eight of the user beans will be serviced by the gateway.

Looking back at FIG. 1A, payload 121 is carried by bus 122 of satellite 120. In one embodiment, payload 121 is configured to provide a communication path between gateway 110 and a plurality of user terminals 130 including communicating with the gateway using a first frequency band while communicating with the user terminals using a user frequency band. Payload 121 is also configured to adjust the communication path (or change communication paths) between the gateway and the plurality of user terminals to include communicating with the gateway using a second frequency band while continuing to communicate with at least substantive user terminals using the user frequency band. The second frequency band has a lower capacity than the first frequency band. For example, the first frequency band may include the Q/V bands and the second frequency band may include the Ka band. The user band may include the Ka band, Ku band, LMDS band, NGSO band, etc.

Figure 5:
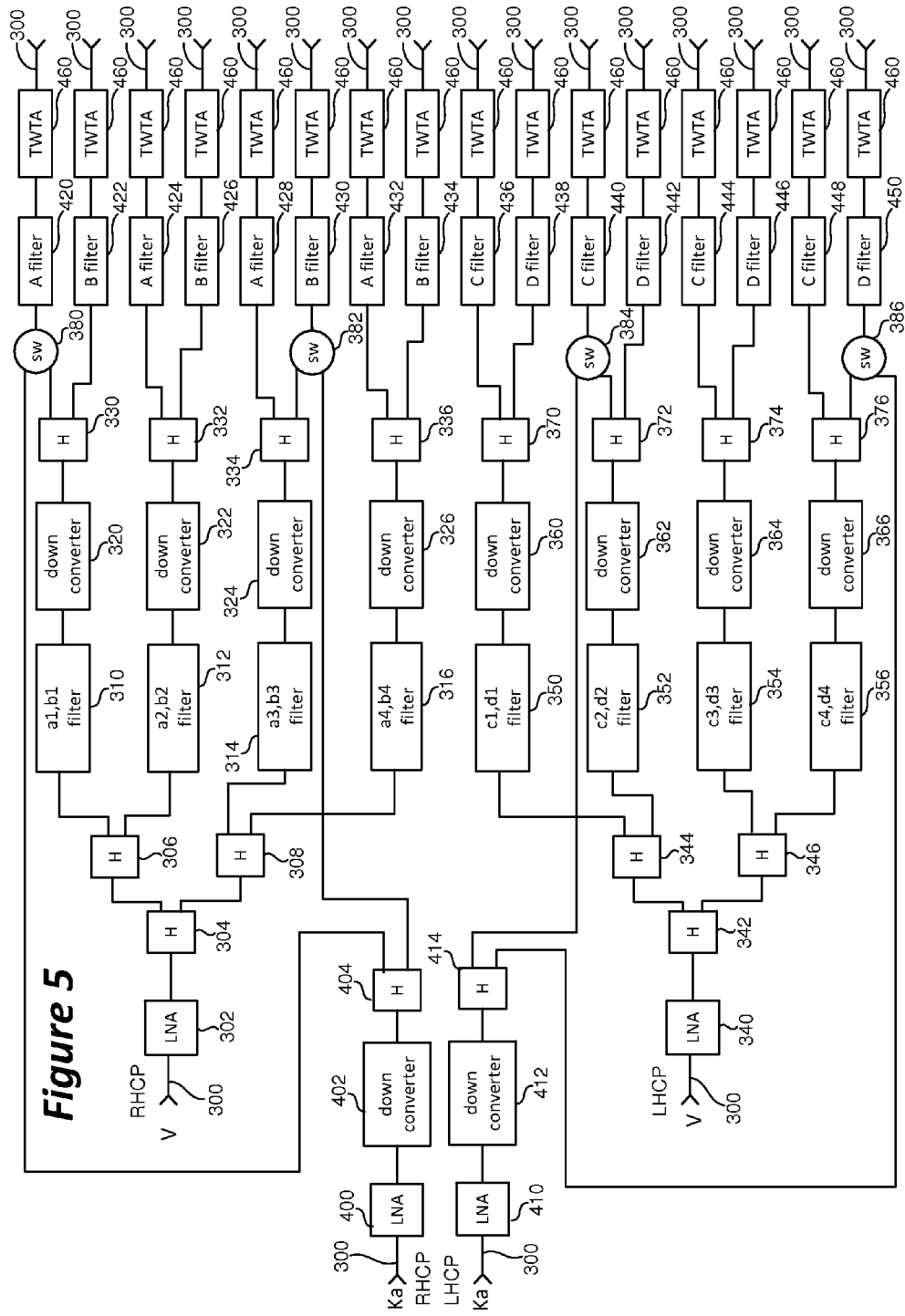
FIG. 5 is a block diagram of one embodiment of components on a satellite that implement the forward communication path.
Figure 6:
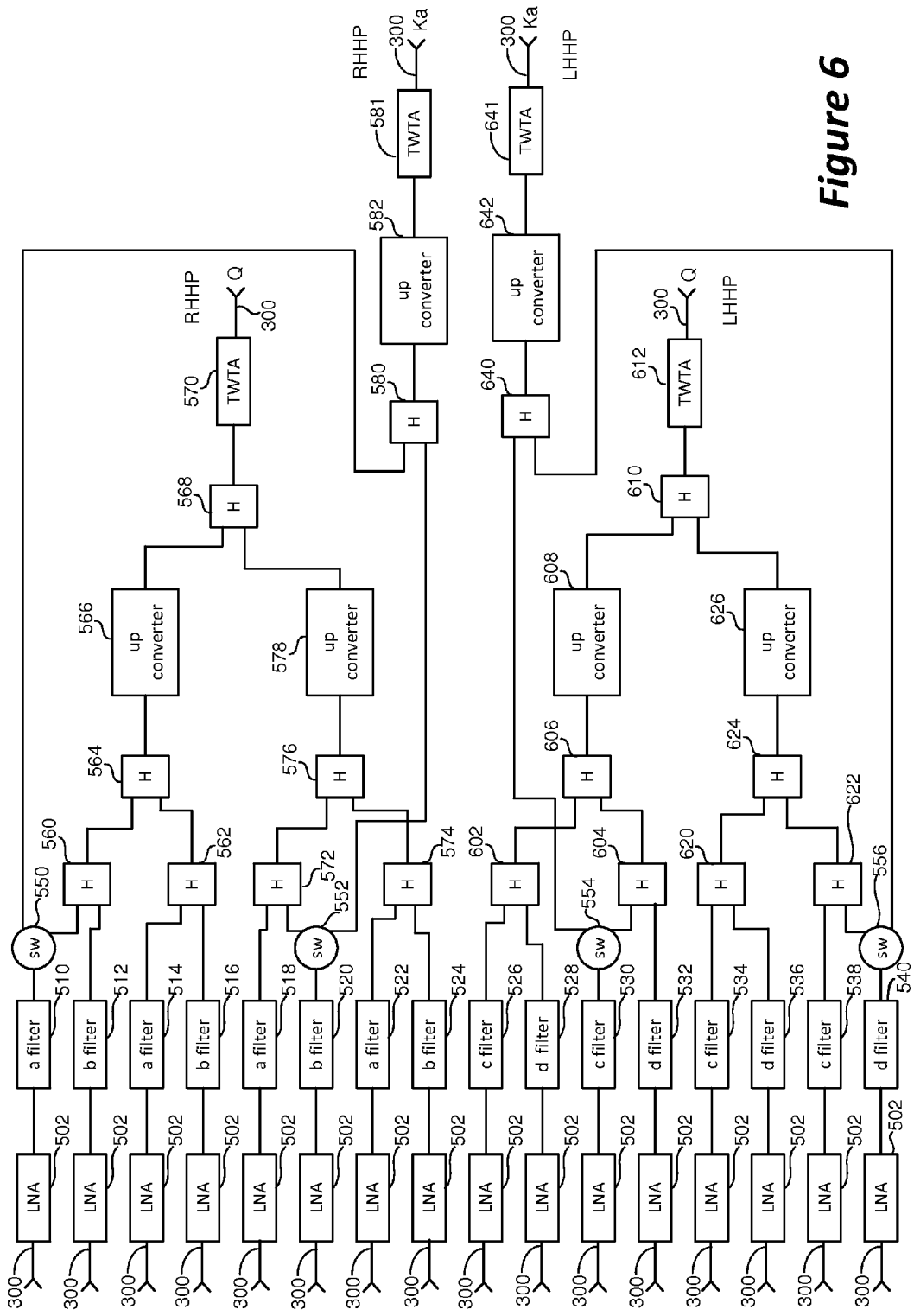
FIG. 6 is a block diagram of one embodiment of components on a satellite that implement the return communication path.

FIGS. 5 and 6 provide block diagrams of an example implementation of a portion of payload 121. FIG. 5 is a block diagram depicting one embodiment of the components that implement the forward direction, which includes communication from the gateway to the user terminals via the satellite. FIG. 6 is a block diagram of one embodiment of components on the satellite that implement the return direction, which includes communication from the user terminals to the gateway via the satellite. The payload structure of FIGS. 5 and 6 includes an antenna system 300. In one embodiment, the antenna system will include four antennas. In other embodiments, more or less than four antennas can be used.

The structure depicted in FIG. 5 includes two communication paths. The first communication path includes a set of one or more frequencies converters configured to provide communication between the gateway and the user terminal by communicating with a gateway using the high capacity frequency band, while communication with the user terminals is using a low capacity frequency band. For example, the first communication path of FIG. 5 can be performed using the Q/V band for communication with the gateway as per FIG. 2A and the Ka band for communication with the user terminals, also as per FIG. 2A. The second communication path includes a second set of one or more frequency converters configured to provide communication between the gateway and the user terminals by communicating with a gateway using a second frequency band which is a low capacity frequency band while communicating with the user terminals using a low capacity frequency band (which may or may not be the same low capacity frequency band used for the gateways). The second communication path implements the situation depicted in FIG. 2B. Looking at FIG. 5, the first communication path begins at low noise amplifiers (LNA) 302 and 340, while the second communication path begins at LNA 400 and LNA 410. Note that the term "frequency converter" can be applied to any component that shifts frequency, even if that component performs other functions too (ie receiver, amplifier, etc.).

Figure 5A:
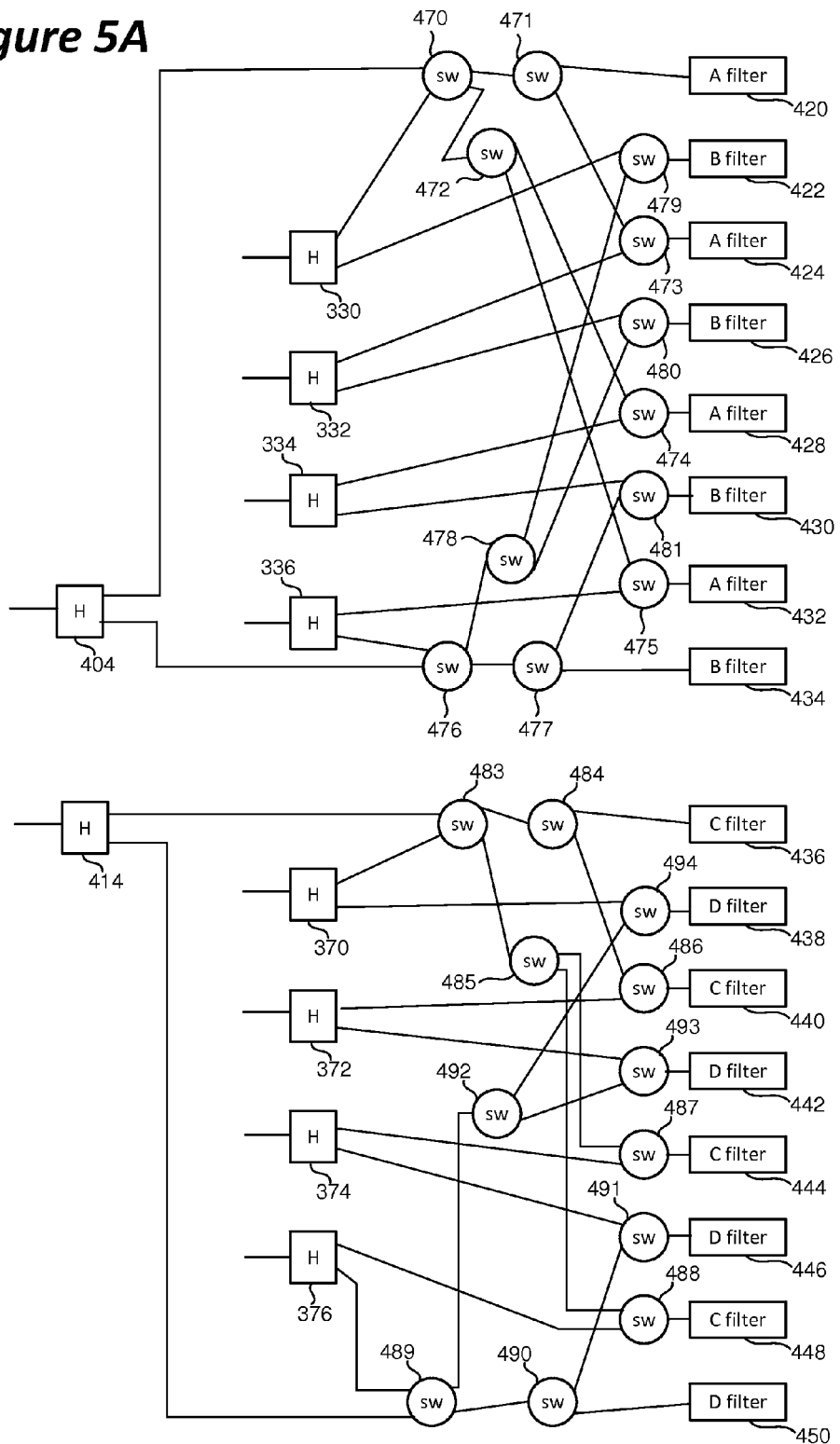
FIG. 5A is a block diagram of one embodiment of components on a satellite that implement the forward communication path.
Figure 7C:
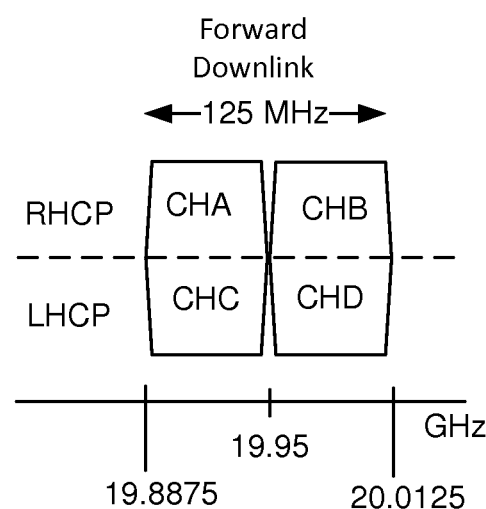
FIG. 7C is a diagram describing frequency assignments for the return downlink of one example embodiment.
Figure 7D:
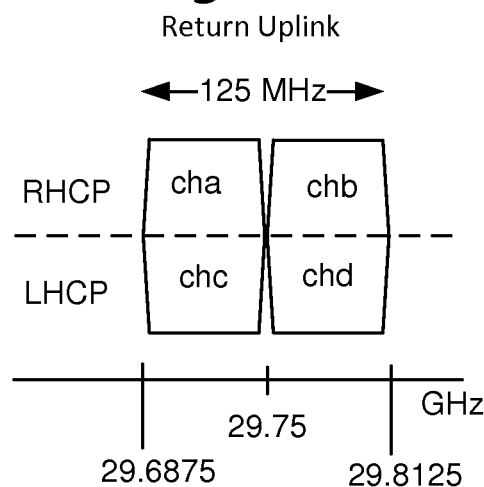
FIG. 7D is a diagram describing frequency assignments for the forward uplink of one example embodiment.
Figure 7E:
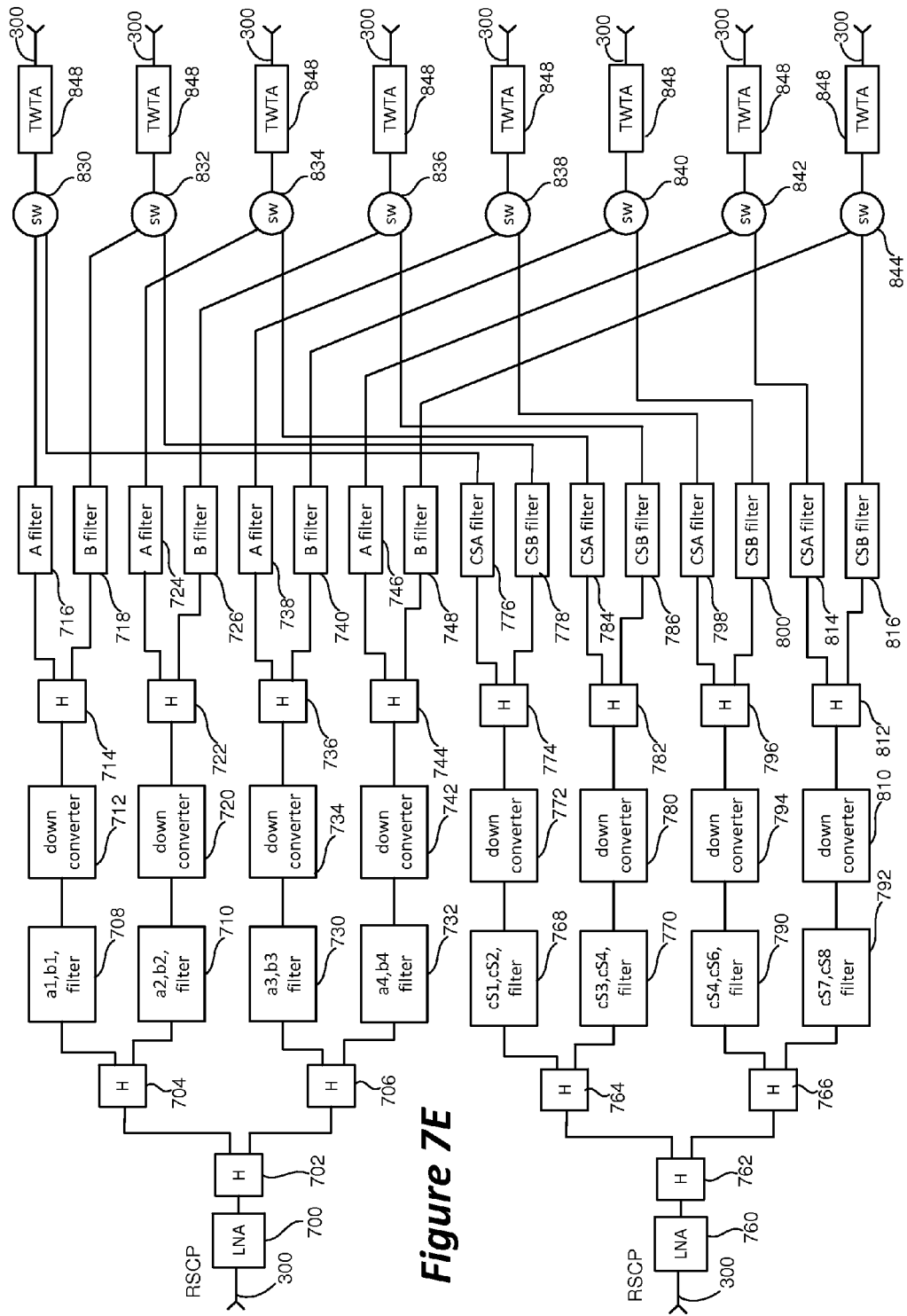
FIG. 7E is a block diagram of one embodiment of components on a satellite that implement the forward communication path.

In one embodiment, antenna system 300 can receive signals using right hand circular polarization and left hand circular polarization. The signal received at the antenna system from the gateway in the right hand circular polarization is provided to LNA 302. The output of LNA 302 is provided to a splitter 304 which splits the signal and sends one output to splitter 306 and another output to splitter 308. Note that the splitters can be implemented by a dedicated splitter or a hybrid component. In the drawings of FIGS. 5, 5A and 7E, the splitters are implemented by hybrid components, designated by an "H." Splitter 306 splits a signal and sends one output to filter 310 and another output to filter 312. Splitter 308 splits its input signal and sends one output to filter 314 and another output to filter 316. As per FIG. 4A-2, the signal received from the gateway includes colors a1, b1, c1, d1, a2, b2, c2, d2, a3, b3, c3, d3, a4, b4, c4 and d4. Filter 310 allows a1 and b1 to pass, with the rest of the frequencies being rejected. Filter 312 allows a2 and b2 to pass. Filter 314 allows a3 and b3 to pass. Filter 326 allows a4 and b4 to pass. The output of filter 310 is provided to down converter 320. The output of down converter 320 is sent to splitter 330. The output of filter 312 is sent to down converter 322. The output of down converter 322 is provided to splitter 332. The output of filter 314 is provided to down converter 324. The output of down converter 324 is provided to splitter 334. The output of filter 316 is provided to down converter 326. The output of down converter 326 is provided to splitter 336. One output of splitter 330 is provided to switch 380 and the other output is provided to filter 422. The output of switch 380 is provided to filter 420. One output of splitter 332 is provided to filter 424 and the other output is provided to filter 426. One output of splitter 334 is provided to filter 428 and the other output it provided to switch 382. The output of switch 382 is provided to filter 430. One output of splitter 336 is provided to filter 432 and the other output is provided to filter 434. Filters 420-434 are band pass filters. Filters 420, 424, 428 and 432 allow color A to pass. Filters 422, 426, 430 and 434 allow color B to pass. The outputs of filters 420-434 are provided to traveling wave tube amplifiers (TWTA) 460. The output of TWTAs 460 are provided to the antenna system 300 for transmission to the user terminals as the user beams described above.

Signals received by the antenna system from gateway 100 using left hand circular polarization are provided by antenna system 300 to LNA 340. The output of LNA 340 is connected to splitter 342. One output of splitter 342 is provided to splitter 344 and the other output is provided to splitter 346. One output of splitter 344 is provided to filter 350 and the other output is provided to filter 352. One output of splitter 346 is provided to filter 354 and the other output is provided to filter 356. Filter 350 allows colors c1 and d1 to pass. Filter 352 allows colors c2 and d2 to pass. Filter 354 allows c3 and d3 to pass. Filter 356 allows c4 and d4 to pass. The output of filter 350 is provided to down converter 360. The output of filter 352 is provided to down converter 362. The output of filter 354 is provided to down converter 364. The output of filter 356 is provided to down converter 366. The output of down converter 360 is provided to splitter 370. The output of down converter 362 is provided to splitter 372. The output of down converter 364 is provided to splitter 374. The output of down converter 366 is provided to splitter 376. The down converters 320, 322, 324, 326, 360, 362, 364 and 366 are used to change the frequency of the signal to a lower frequency, thereby, down converting the signal with respect to frequency.

The first output of splitter 370 is provided to filter 436 and the other output is provided to filter 438. The first output of splitter 372 is provided to switch 384 and the other output is provided to filter 442. The output of switch 384 is provided to filter 440. The first output of splitter 375 is provided to filter 444 and the second output is provided to filter 446. The first output if splitter 376 is provided to filter 448 and the other output is provided to switch 386. The output of switch 386 is provided to filter 450. Filters 436, 440, 444, and 448 are band pass filters that allow the color C to pass. Filters 438, 442, 446 and 450 are band pass filters that only allow the color D to pass. The output of filters 436-450 are sent to TWTAs 460, and the output of TWTAs 460 are provided to antenna 300 for transmission in the user beams to the user terminals. Beam forming can be accomplished by any of the many known methods, including a feed array without beam former, an onboard fixed beam forming network, and onboard electronic beam former, as well as other means.

The circuit described above in FIG. 5 with respect to the first communication path (starting at LNA 302 and LNA 340) is used to change the frequencies from the uplink signal according to the V band frequency assignment of FIG. 4A-2 to the downlink ka band frequency assignments of FIG. 3A.

FIG. 5 also includes a second communication path to implement the situation of FIG. 2B, which includes communicating with the gateways at the lower frequency band when there is rain fade or other issues with closing the link. In that situation, the Ka band signals from the gateways are received via the antenna system 300 and provided to LNA 400 for right hand circular polarization and to LNA 410 for left hand circular polarization. The output of LNA 400 is provided to down converter 402 and then sent to splitter 404. One output of splitter 404 is provided to switch 380 and the other output is provided to switch 382. The output of LNA 410 is provided to down converter 412. The output of down converter 412 if provided to splitter 414. One output of splitter 414 is provided to switch 384 and the other output is provided to switch 386. In this manner, when the system switches to the second communication path that includes communicating with the gateway using a lower frequency band, switch 380, switch 382, switch 384 and switch 386 are controlled to choose the output of splitters 404 and 414 so that the signal from the gateways are provided to filter 420, filter 430, filter 440 and filter 450 so that only four user beams will receive information/data from the gateway.

As described above, FIG. 6 depicts the components on the satellite that implement the return direction. The circuit of FIG. 6 also includes two communication paths: one communication path for when communication with the gateway is performed using the high capacity frequency band and another communication path for when the communication with the gateways are performed using the low capacity frequency band. The communication path that includes using the high capacity frequency band (e.g., Q band) for communication with the gateway ends at TWTA 570 and TWTA 612. The communication path for communication with the gateway using the low capacity frequency band (e.g., Ka band) ends at TWTA 581 and TWTA 641.

The return uplink from the user beams are received at antenna system 300 and provided to the various LNAs 502. The output of each LNA 502 is provided to one of filters 510-540. The return uplink signal received from the user beams is provided according to the frequency plan of FIG. 3B which includes colors a, b, c and d. Filter 510, filter 514, filter 518 and filter 522 are band pass filters that allow color a to pass. Filter 512, filter 516, filter 520 and filter 522 are band pass filters that allow color b to pass. Filter 526, filter 530, filter 534 and filter 538 are band pass filters that allow color c to pass. Filter 528, filter 532, filter 536 and filter 540 are band pass filters that allow color d to pass.

Figure 6A:
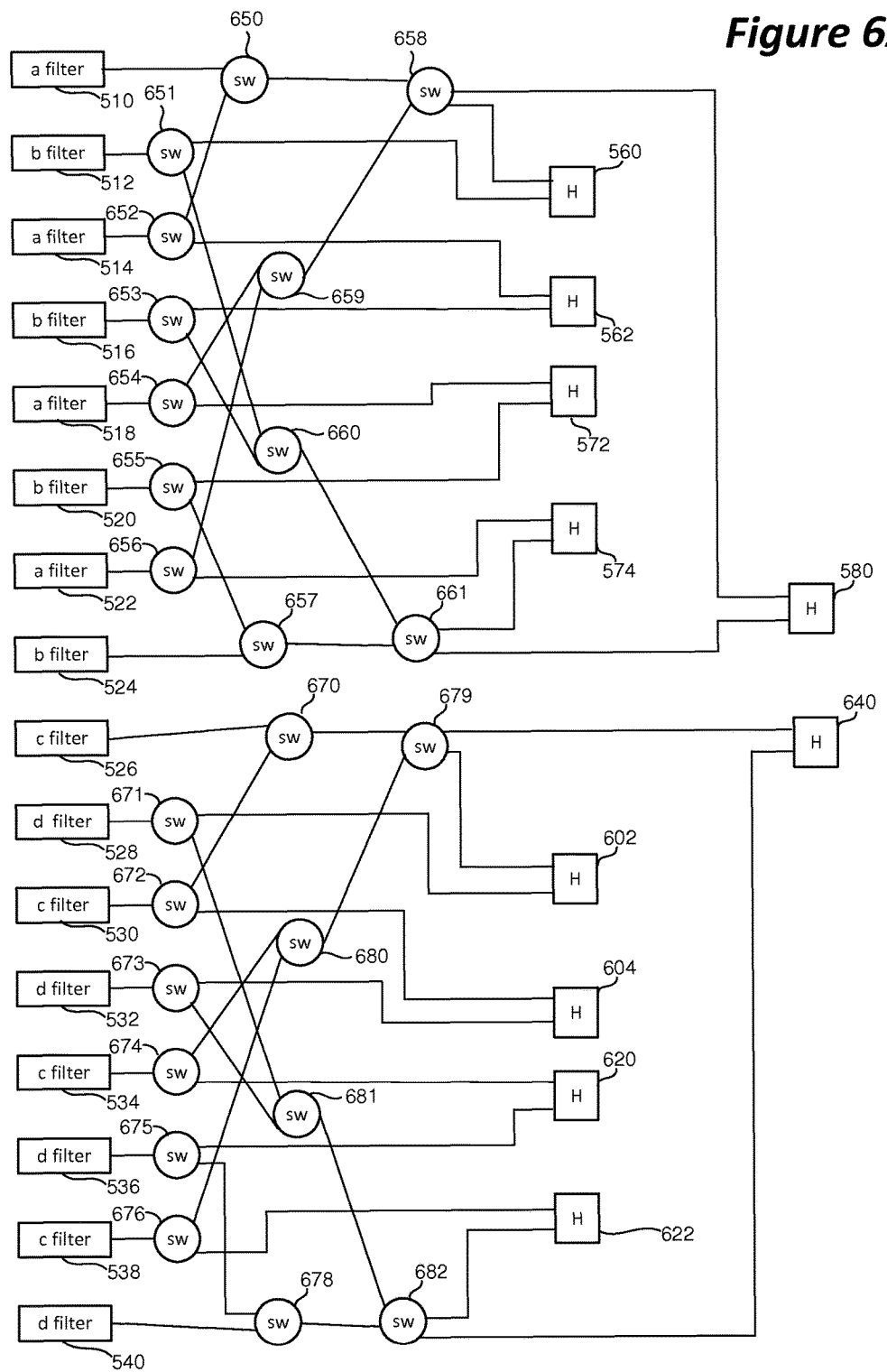
FIG. 6A is a block diagram of one embodiment of components on a satellite that implement the return communication path.
Figure 7F:
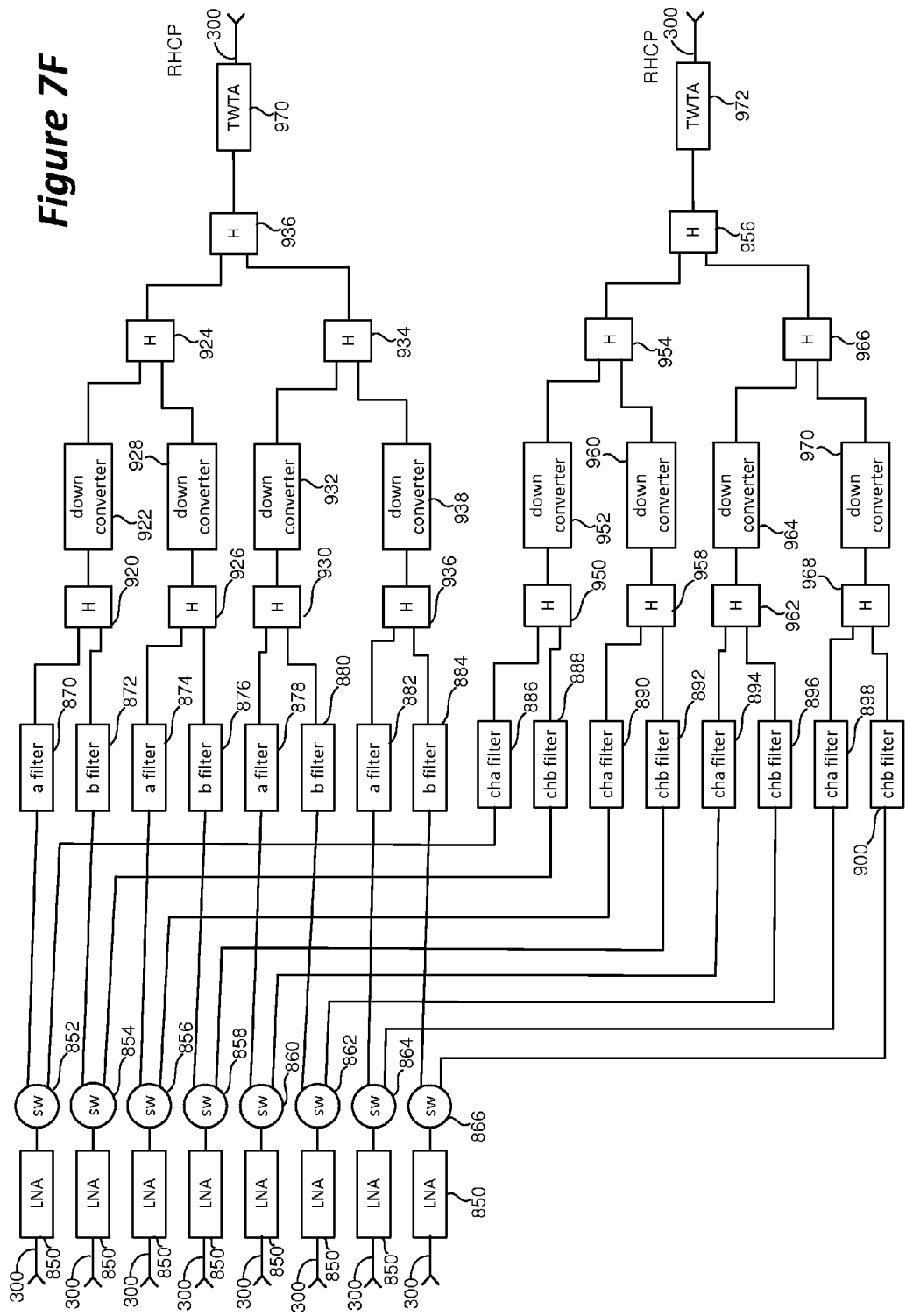
FIG. 7F is a block diagram of one embodiment of components on a satellite that implement the return communication path.

The output of filter 510 is provided to switch 550. One output of switch 550 is provided to coupler 560 and the other output is provided to coupler 580. Note that the couplers can be implemented by a dedicated coupler or a hybrid component. In the drawings of FIGS. 6, 6A and 7F, the couplers are implemented by hybrid components, designated by an "H." The output of filter 512 is also provided to coupler 560. The output of filter 514 is provided to coupler 562. The output of filter 516 is provided to coupler 562. The output of filter 518 is provided to coupler 572. The output of filter 520 is provided to switch 552. One output of switch 552 is provided to coupler 572 and the other output of switch 552 is provided to coupler 580. The output of filter 522 is provided to coupler 574. The output of filter 524 is provided to coupler 574. The output of filter 526 is provided to coupler 602. The output of filter 528 is provided to coupler 602. The output of filter 530 is provided to switch 554. One output of switch 554 is provided to coupler 640 and the other output is provided to coupler 604. The output of filter 532 is provided to coupler 604. The output of filter 534 is provided to coupler 620. The output of filter 536 is provided to coupler 620. The output of filter 538 is provided to coupler 622. The output of filter 540 is provided to switch 556. One output of switch 556 is provided to coupler 622 and the other output is provided to coupler 640. The outputs of couplers 560 and 562 are provided to coupler 564. The output of coupler 564 is provided to up converter 566. The up converter changes the frequency of its input signal to a higher frequency. The output of up converter 566 is provided to coupler 568. The output of coupler 568 is provided to TWTA 570 and the output of TWTA 570 is provided to antenna system 300 for transmission of the downlink to the gateway (feeder beam—return downlink 115). The output of couplers 572 and 574 are provided to coupler 576. The output of coupler 576 is provided to up converter 578. The output of up converter 578 is provided to coupler 568. The output of couplers 602 and 604 are provided to coupler 606. The output of coupler 606 is provided to up converter 608. The output of up converter 608 is provided to coupler 610. The output of coupler 610 is provided to TWTA 612. The output of TWTA 612 is provided to antenna system 300 for transmission using left hand circular polarization to the gateway. The output of couplers 620 and 622 are provided to coupler 624. The output of coupler 624 is provided to up converter 626. The output of up converter 626 is provided to coupler 610. The output of coupler 610 is provided to TWTA 612. The output of TWTA 612 is provided to antenna system 300 for transmission of the downlink to the gateway (feeder beam—return downlink 115).

The output of coupler 580 is provided to up converter 582. The output of up converter 582 is provided to TWTA 581. The output of TWTA 581 is provided to antenna system 300 for transmission to the gateway. The output of coupler 640 is provided to up converter 642. The output of up converter 642 is provided to TWTA 641. The output of TWTA 641 is provided to antenna system 300 for transmission to the gateway using left hand circular polarization.

When the satellite is communicating with the gateways using the higher capacity frequency band (e.g. Q/V band), the transmission path to the gateway will be via up converters 566, 578, 608, and 626, as well as TWTAs 570 and 612. When the gateways are communicating with a satellite using the lower capacity frequency band (e.g. Ka band), then the communication path will be via up converters 582 and 642, as well as TWTAs 581 and 641. Switches 550, 552, 554 and 556 are used to switch between the communication path for the high capacity frequency band and the communication path for the lower capacity frequency band.

In the embodiments of FIGS. 2B, 4B-1 and 4B-2, 5 and 6, communicating with the gateway using the low capacity frequency band includes only servicing a subset of user beams (and, thus, a subset of user terminals) because the gateway (feeder) beams have less capacity. In the specific implementation of FIGS. 5 and 6, the four colors of the feeder beam are used to service only four user beams, so that twelve user beams (and the user terminals in those beams) are ignored. FIGS. 5A and 6A illustrate another embodiment in which the four colors of the feeder beam are time multiplexed with the sixteen user beams so that each user beams gets to operate ¼ of the time.

FIG. 5A is a block diagram depicting one embodiment of a subset of the components that implement the forward direction, which includes communication from the gateway to the user terminals via the satellite. The embodiment of FIG. 5A uses all of the components of FIG. 5, except that switches 380, 382, 384 and 386 are removed and replaced by switches 470, 471, 472, 473, 474, 475, 476, 477, 478, 479, 480, 481, 482, 483, 484, 485, 486, 487, 488, 489, 490, 491, 492, 493 and 494. Because FIG. 5A uses the same components as FIG. 5, many of those components are left off the drawing to make the drawing easier to read. Thus, FIG. 5A only shows the changes to FIG. 5 rather than the entire circuit.

In the circuit of FIG. 5A, the output of splitter (e.g., hybrid) 404 is connected to the inputs of switches 470 and 476. One output of switch 470 is connected to the input of switch 471 and the other output of switch 470 is connected to the input of switch 472. One output of switch 471 is connected to A filter 420 and the other output is connected to the input of switch 473. The output of switch 473 is connected to A filter 424. One output of switch 472 is connected to the input of switch 474 and the other output of switch 472 is connected to the input of switch 475. The output of switch 474 is connected to A filter 428. The output of switch 475 is connected to A filter 432. One output of switch 476 is connected to the input of switch 477 and the other output is connected to the input of switch 478. One output of switch 477 is connected to B filter 434 and the other output is connected to the input of switch 481. The output of switch 481 is connected to B filter 430. One output of switch 478 is connected to the input of switch 479 and the other output of switch 478 is connected to the input of switch 480. The output of switch 479 is connected to B filter 422. The output of switch 480 is connected to A filter 426.

One output of splitter 330 is connected to an input of switch 479 and the other output of splitter 330 is connected to the input of switch 479. One output of splitter 332 is connected to an input of switch 473 and the other output of splitter 330 is connected to the input of switch 480. One output of splitter 334 is connected to an input of switch 474 and the other output of splitter 330 is connected to the input of switch 481. One output of splitter 336 is connected to an input of switch 475 and the other output of splitter 330 is connected to the input of switch 476.

The output of splitter (e.g., hybrid) 414 is connected to the inputs of switches 483 and 489. One output of switch 483 is connected to the input of switch 484 and the other output of switch 436 is connected to the input of switch 485. One output of switch 484 is connected to C filter 436 and the other output is connected to the input of switch 486. The output of switch 486 is connected to C filter 440. One output of switch 485 is connected to the input of switch 487 and the other output of switch 485 is connected to the input of switch 488. The output of switch 487 is connected to C filter 444. The output of switch 488 is connected to C filter 448. One output of switch 489 is connected to the input of switch 490 and the other output is connected to the input of switch 492. One output of switch 490 is connected to D filter 450 and the other output is connected to the input of switch 491. The output of switch 491 is connected to D filter 446. One output of switch 492 is connected to the input of switch 493 and the other output of switch 493 is connected to the input of switch 494. The output of switch 493 is connected to D filter 442. The output of switch 494 is connected to D filter 438.

One output of splitter 370 is connected to an input of switch 483 and the other output of splitter 370 is connected to the input of switch 494. One output of splitter 372 is connected to an input of switch 486 and the other output of splitter 372 is connected to the input of switch 493. One output of splitter 374 is connected to an input of switch 487 and the other output of splitter 374 is connected to the input of switch 491. One output of splitter 376 is connected to an input of switch 488 and the other output of splitter 376 is connected to the input of switch 489.

Switches 470, 471, 472, 473, 474, 475, 476, 477, 478, 479, 480, 481, 482, 483, 484, 485, 486, 487, 488, 489, 490, 491, 492, 493 and 494 are controlled by a processor in the communications payload or in the bus to time multiplex the sixteen user beams.

FIG. 6 is a block diagram of one embodiment of components on the satellite that implement the return direction, which includes communication from the user terminals to the gateway via the satellite. The embodiment of FIG. 6A uses all of the components of FIG. 6, except that switches 550, 552, 554 and 556 are removed and replaced by switches 650, 651, 652, 653, 654, 655, 656, 657. 658. 659, 660, 661, 670, 671, 672, 673, 674, 675, 676, 677, 678, 679, 680, 681 and 682. Because FIG. 6A uses the same components as FIG. 6, many of those components are left off the drawing to make the drawing easier to read. Thus, FIG. 6A only shows the changes to FIG. 6 rather than the entire circuit.

In the circuit of FIG. 6A, one input of switch 650 is connected to the output of a filter 510 and other input of switch 650 is connected to the output of switch 652. The output of b filter 512 is connected to the input of switch 651. The output of a filter 514 is connected to the input of switch 652. The output of b filter 516 is connected to the input of switch 653. The output of a filter 518 is connected to the input of switch 654. The output of b filter 520 is connected to the input of switch 655. The output of a filter 522 is connected to the input of switch 656. The output of b filter 524 is connected to one input of switch 657, with the other input of switch 657 being connected to one of the outputs of switch 655. Switch 659 has one input connected to one of the outputs of switch 654 and another input connected to one of the outputs of switch 656. Switch 660 has one input connected to one or the outputs of switch 651 and another input connected to one of the outputs of switch 653. Switch 658 has one input connected to the output of switch 650 and another input connected to the output of switch 659. Switch 661 has one input connected to the output of switch 657 and another input connected to the output of switch 660. Combiner 560 receives one input from switch 658 and the other input from switch 651. Combiner 562 receives one input from switch 652 and the other input from switch 653. Combiner 572 receives one input from switch 654 and the other input from switch 655. Combiner 574 receives one input from switch 656 and the other input from switch 661. Combiner 580 receives one input from switch 658 and the other input from switch 661.

One input of switch 670 is connected to the output of c filter 526 and other input of switch 670 is connected to the output of switch 672. The output of d filter 528 is connected to the input of switch 671. The output of c filter 530 is connected to the input of switch 672. The output of d filter 532 is connected to the input of switch 673. The output of c filter 534 is connected to the input of switch 7 The output of d filter 536 is connected to the input of switch 675. The output of c filter 538 is connected to the input of switch 676. The output of d filter 540 is connected to one input of switch 678, with the other input of switch 658 being connected to one of the outputs of switch 675. Switch 680 has one input connected to one or the outputs of switch 674 and another input connected to one of the outputs of switch 676. Switch 681 has one input connected to one of the outputs of switch 671 and another input connected to one of the outputs of switch 673. Switch 679 has one input connected to the output of switch 670 and another input connected to the output of switch 680. Switch 682 has one input connected to the output of switch 681 and another input connected to the output of switch 678. Combiner 602 receives one input from switch 671 and the other input from switch 679. Combiner 604 receives one input from switch 672 and the other input from switch 673. Combiner 620 receives one input from switch 674 and the other input from switch 675. Combiner 622 receives one input from switch 676 and the other input from switch 682. Combiner 640 receives one input from switch 679 and the other input from switch 682.

Switches 650, 651, 652, 653, 654, 655, 656, 657. 658. 659, 660, 661, 670, 671, 672, 673, 674, 675, 676, 677, 678, 679, 680, 681 and 682 are controlled by a processor in the communications payload or in the bus to time multiplex the sixteen user beams.

In the embodiments of FIGS. 2B, 4B-1 and 4B-2, 5 and 6, communicating with the gateway using the low capacity frequency band includes only servicing a subset of user beams (and, thus, a subset of user terminals) because the gateway (feeder) beams have less capacity. In another embodiment, when communicating with the gateway using the lower capacity frequency band, the gateway will still continue to service all of the user beams; however, less capacity will be provided to each of the user beams. This latter embodiment is described by FIGS. 7A-7F. FIG. 7A shows the frequency plan for the return downlink. FIG. 7B shows the frequency plan for the forward uplink. Thus, FIGS. 7A and 7B describe the frequency plan for communication between the satellite and the gateway. FIG. 7C describes the frequency plan for the forward downlink. FIG. 7D provides the frequency plan for the return uplink. Therefore, FIGS. 7C and 7D describe communication between the satellite and the user terminals.

FIG. 7A shows the frequency plan for the gateways communicating in the Ka band. However, in other embodiments, the gateway can communicate in another low capacity frequency band. In the embodiment of FIG. 7A, the frequency band is divided into 16 colors or channels CH1-CH16. Eight of the channels (CH1, CH2, CH3, CH4, CH5, CH6, CH7 and CH8) are using right hand circular polarization and eight other channels (CH9, CH10, CH11, CH12, CH13, CH14, CH15 and CH16) use left hand circular polarization, thus eight channels per polarization. The band runs from 19.7 GHz to 20.2 GHz. Each of the channels has bandwidth of 62.5 MHz.

FIG. 7B depicts the forward uplink between the gateway and the satellite, with 16 channels. Eight of the channels (ch1, ch2, ch3, ch4, ch5, ch6, ch7 and ch8) use right hand circular polarization and eight of the channels (ch9, ch10, ch11, ch12, ch13, ch14, ch15 and ch16) use left hand circular polarization. The band runs from 29.6 GHz to 30.0 GHz, with each channel having a bandwidth of 62.5 MHz. In this embodiment, when there is no problems closing a link (i.e. no rain fade) communication between the satellite gateway will use the frequency plan of FIGS. 4A-1 to 4A-2. If there is a problem closing the link (e.g. rain fade), the satellite will switch its circuits (see FIGS. 7E and 7F) so that communication between the satellite and the gateway will operate according to the frequency plan of FIGS. 7A and 7B.

FIG. 7C shows the frequency plan for the forward downlink, which includes communication between the satellite and user terminals using the Ka band. FIG. 7C shows four channels CHA, CHB, CHC and CHD. Each of the four channels has a bandwidth of 62.5 MHz. The channels CHA and CHB use right hand circular polarization and the channels CHC and CHD use left hand circular polarization. The four channels occupy the band between 19.8875 GHz and 20.0125 GHz.

FIG. 7D shows the frequency plan for the return uplink, which includes communication between the user terminals and the satellite. FIG. 7D shows four channels: cha, chb, chc, and chd. The four channels occupy the band between 29.6875 GHz and 29.8125 GHz. Each channel is 62.5 MHz. The colors cha and chb use right hand circular polarization and the colors chc and chd use left hand circular polarization. In one embodiment, when the satellite is communicating with the gateway using the high capacity frequency band, communication with the user terminals will be according to FIGS. 3A and 3B, and when the satellite is communicating with the gateway using the low capacity frequency band, communication between the satellite and the user terminals is performed according to the frequency plans of FIGS. 7C and 7D. Note that the frequency plans of FIGS. 3A and 3B as well as the frequency plans of FIGS. 7C and 7D are both in the Ka band, therefore, even though the user terminals will switch frequency plans from FIGS. 3A/3B to FIGS. 7C/7D, the user terminals are not switching bands as they are remaining in the Ka band.

FIGS. 7F and 7E provide another embodiment of a hardware implementation of a portion of payload 121 that can implement the embodiment of FIGS. 7A-7D. That is, when the satellite switches communication with a gateway from the high capacity frequency band to the low capacity frequency band, the components of FIGS. 7F and 7E will switch internal communication paths within the satellite to implement this change.

FIG. 7E is a block diagram of the components on satellite 120 in communication payload 121 that implement the forward direction. These components include two communication paths: one communication path for communicating with the gateway using the high capacity frequency band and one communication path for communicating with the gateway using a low capacity frequency band. The communication between the gateway and the satellite will include transmission of signals using right hand circular polarization and left hand circular polarization. However, due to complexity of the drawing, FIG. 7E only shows the components for right hand circular polarization. The components for left hand circular polarization would be a similar structure except A filter would be replaced by C filter, B filter would be replaced by D filter, CHA filter would be replaced by CHC filter, CHB filter would be replaced by CHD filter, etc. When communicating with a gateway using the high capacity frequency band (first communication path), right hand circular polarization signals from antenna system 300 are received at LNA 700. When communicating with a gateway using the low capacity frequency band, right hand circular polarization signals received from the gateway at antenna system 300 are provided to LNA 760.

The output of LNA 700 is provided to splitter 702. One output of splitter 702 is provided to splitter 704 and the other output is provided to splitter 706. One output of splitter 704 is provided to filter 708 and the other output is provided to filter 710. One output of splitter 706 is provided to filter 730 and the other output is provided to filter 732. The signal received from the gateway is according to the frequency plan of FIG. 4A-2, which includes receiving colors a1, b1, a2, b2, a3, b3, a4, b4 on the right hand circular polarization. Filter 708 is a band pass filter that allows colors a1 and b1. Filter 710 is a band pass filter that allows colors a2 and b2 to pass. Filter 730 is the band pass filter that allows colors a3 and b3 to pass. Filter 732 is a band pass filter that allows colors a4 and b4 to pass. The output of filter 708 is provided to down converter 712. The output of down converter 712 is provided to splitter 714. One output of splitter 714 is provided to filter 716 and the other output is provided to filter 718. The output of filter 710 is provided to down converter 720. The output of down converter 720 is provided to splitter 722. One output of splitter of 722 is provided to filter 724 and the other output is provided to filter 726. The output of filter 730 is provided to down converter 734. The output of down converter 734 is provided to splitter 736. One output of splitter 736 is provided to filter 738 and the other output is provided to filter 740. The output of filter 732 is provided to down converter 742. The output of down converter 742 is provided to splitter 744. One output of splitter 744 is provided to filter 746 and the other output is provided to filter 748.

The output of LNA 760 is provided to splitter 762. One output of splitter 762 is provided to splitter 764 and the other output is provided to splitter 766. One output of splitter 764 is provided to filter 768 and the other output is provided to filter 770. One output of splitter 766 is provided to filter 790 and the other output is provided to filter 792. When communicating with a gateway using the low capacity frequency band, the signal received from the gateway is according to the frequency plan of FIG. 7B which includes colors ch1, ch2, ch3, ch4, ch5, ch6, ch7 and ch8 using right hand circular polarization. Filter 768 is a band pass filter that allows colors ch1 and ch2 to pass. Filter 770 is a band pass filter that allows colors ch3 and ch4 to pass. Filter 790 is a band pass filter that allows colors ch4 and ch6 to pass. Filter 792 is a band pass filter that allows colors ch7 and ch8 to pass. The output of filter 768 is provided to down converter 772. The output of down converter 772 is provided to splitter 774. The first output of splitter 774 is provided to filter 776 and the second output is provided to filter 778. The output of filter 770 is provided to down converter 780. The output of down converter 780 is provided to splitter 782. The output of splitter 782 is provided to filter 784 and the other output is provided to filter 786. The output of filter 790 is provided to down converter 794. The output of down converter 794 is provided to splitter 796. The first output of splitter 786 is provided to filter 798 and the second output is provided to filter 800. The output of filter 792 is provided to down converter 810. The output of down converter 810 is provided to splitter 812. The first output of splitter 812 is provided to filter 814 and the second output is provided to filter 816.

Filters 716, 724, 738 and 746 are band pass filters that allow color A to pass. Filters 718, 726, 740 and 748 are band pass filters that allow color B to pass. Filters 776, 784, 798 and 814 are band pass filters that allow color CHA to pass. Filters 778, 786, 800 and 816 are band pass filters that allow color CHB to pass. The output of filters 716 and 776 are provided to switch 830. The output of filters 718 and 778 are provided to switch 832. The output of filters 724 and 784 are provided to switch 834. The output of filters 727 and 786 are provided to switch 836. The output of filters 738 and 798 are provided to switch 838. The output of filters 740 and 800 are provided to switch 840. The output of filters 846 and 814 are provided to switch 842. The output of filters 748 and 816 are provided to switch 84. The output of switches 830, 832, 834, 836, 838, 840, 842 and 844 provided to TWTA(s) 848. The output of TWTA(s) 848 are provided to antenna system 300, which transmits signals to the various user beams. Thus the satellite will receive signals from the gateway via LNA 700 if communicating with the gateway using high capacity frequency band and via LNA 760 if communicating with the gateway using the low capacity frequency band. Switches 830, 832, 834, 836, 838, 840, 842 and 844 are used to switch between the path from LNA 700 or the path from LNA 760 to send the correct signal down to the user beams.

FIG. 7F is a block diagram of the components on payload 121 of satellite 120 that implement return direction 102 for the embodiment of FIGS. 7A-7D. Like FIG. 7E, FIG. 7F only shows the hardware components for right hand circular polarization. An analogous circuit would be included for left hand circular polarization. Signals received from the various user beams at the antenna system 300 are provided to the set of LNAs 850. The LNAs will provide the amplified received signal to a set of switches 852, 854, 856, 858, 860, 862, 864 and 866. Depending on whether the satellite is communicating with the gateway using the low capacity frequency band or high capacity frequency band, the switches 852-866 will be commanded to send the data on the appropriate one of two paths. Note that the switches of FIGS. 5, 6, 7E and 7F are controlled by a processor in payload 121. Alternatively, the switches can be controlled by a processor in bus 122 or by a processor on ground which sends commands to the satellite. In another embodiment, the gateway can send commands to the satellite to change the switches.

Switch 852 has two outputs. The first output of switch 852 is provided to filter 870 and the second output is provided to filter 886. The first output of switch 854 is provided to filter 872 and the second output is provided to filter 888. The first output of switch 856 is provided to filter 874 and the second output is provided to filter 890. The first output if switch 858 is provided to filter 876 and the second output is provided to filter 892. The first output of switch 860 is provided to filter 878 and the second output is provided to filter 894. The first output of switch 862 is provided to filter 880 and the second output is provided to filter 896. The first output of switch 864 is provided to filter 882 and the second output is provided to filter 898. The first output of switch 866 is provided to filter 884 and the second output is provided to filter 900. The signals received from the user beams by antenna system 300 for the return path will be according to FIG. 3B when communication with the gateway is using the high capacity frequency band and via FIG. 7D when communication with the gateway is using the low capacity frequency band. Filters 870, 874, 878 and 882 are band pass filters that allow color a to pass. Filters 872, 876, 880 and 884 are band pass filters that allow color b to pass. Filters 886, 890, 894 and 898 are band pass filters that allow color cha to pass. Filters 888, 892, 896 and 900 are band pass filters that allow color chb to pass.

The outputs of filters 970 and 972 are provided to coupler 920. The output of coupler of 920 is connected to down converter 922. The output of down converter 922 is provided to coupler 924. The output of coupler 924 is provided to coupler 936. The output of filters 874 and 876 are provided to coupler 926. The output of coupler 926 is provided to down converter 928. The output of down converter 928 is provided to coupler 924. The output of filters 878 and 880 are provided to coupler 930. The output of coupler 930 is provided to down converter 932. The output of down converter 932 is provided to coupler 934. The output of filters 882 and 884 are provided to coupler 936. The output of coupler 936 is provided to down converter 938. The output of down converter 938 is provided to coupler 934. The output of coupler 934 is provided to coupler 936.

The outputs of filters 886 and 888 are provided to coupler 950. The output of coupler 950 is provided to down converter 952. The output of down converter 952 is provided to coupler 954. The output of coupler 954 is provided to coupler 956. The output of filters 890 and 892 are provided to coupler 958. The output of coupler 958 is provided to down converter 960. The output of down converter 960 is provided to coupler 954. The output of filters 894 and 896 are provided to coupler 962. The output of coupler 962 is provided to down converter 964. The output of down converter 964 is provided to coupler 966. The output of coupler 966 is provided to coupler 956. The output of filters 898 and 900 are provided to coupler 968. The output of coupler 968 is provided to down converter 970. The output of down converter 970 is provided to coupler 966. The output of coupler 966 is provided to coupler 956.

The output of coupler 956 is provided to TWTA 970 for transmission to the gateway when communication between the satellite and the gateway is using the high capacity frequency band. The output of coupler 956 is provided to TWTA 972 which is connected to an antenna system 300 for transmission to the gateway when the gateway is communicating with a satellite using the low capacity frequency band. Thus, the signals received by LNAs 850 are switched between the two communication paths ending at TWTA 970 or TWTA 972 depending on whether communication between the satellite and the gateway is using the high capacity frequency band or the low capacity frequency band. Like FIGS. 5 and 6, FIGS. 7E and 7F include a first set of one or more frequency converters configured to provide a first transmission path between the gateway and a satellite using a first frequency band and a second set of one or more frequency converters configured to provide a second transmission path for the second frequency band.

Figure 8:
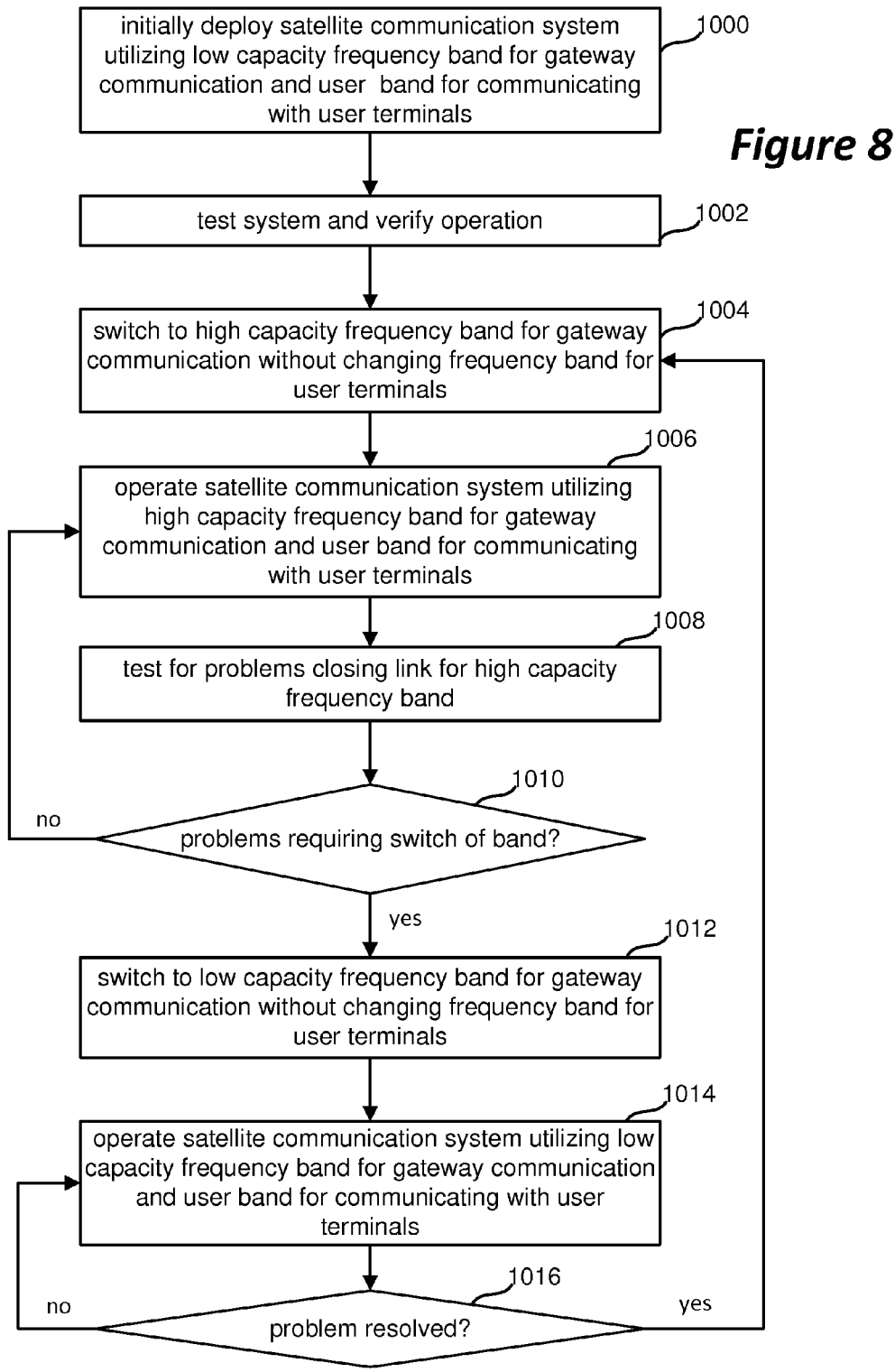
FIG. 8 is a flow chart describing one embodiment of the operation of an example satellite.

FIG. 8 is a flowchart describing one embodiment for operating the components of FIGS. 5 and 6 or the components of FIGS. 7E and 7F. In step 1000, the satellite communication system is initially deployed using the low capacity frequency band for communication between the gateway and the satellite and the user band for communication between the satellite and the user terminals. In one embodiment, the low capacity frequency band for the gateway is the same as the user band for the user terminals (e.g., Ka band); however, in other embodiments the two bands are different. The process performed in step 1000 includes implementing, for example, FIG. 2B or FIG. 2C as well as the frequency plans of FIG. 3A, 3B, 4B-1, 4B-2, 4C-1 or 4C-2.

In step 1002, the system will be tested to verify operation. Once the system is fully functional and verified to be operating as expected, the system will switch communication between the satellite and gateway to the high capacity frequency band in step 1004. However, communication between the satellite and the user terminals will not change frequency bands, and will remain using the user band. Thus, in step 1006, the satellite communication system will be operated utilizing the high capacity frequency band for communication between the gateway and the satellite and the user band for communication between the satellite and the user terminals. Step 1006 includes utilizing the color assignments of FIGS. 3A/3B or for the user terminals. For the gateways, the system will implement FIGS. 4A-1 and 4A-2. Step 1006 also includes implementing, for example, the configuration of FIG. 2A.

In step 1008, the system will test for problems closing a link for the high capacity frequency band. In one embodiment, step 1008 is continually performed, rather than being performed in a sequence as graphically depicted in FIG. 8. If there are no problems closing the link, then the process would loop back to step 1006. That is, the system will continually operate using the high frequency band until there is a problem closing a link. In one example, if the satellite and gateway cannot close the communication link using a reasonable set of modulation and coding, then the satellite knows there is a problem requiring switching of the communication band between the satellite and the gateway. In another embodiment, the satellite will emit a beacon signal that is monitored by the gateway. If the strength of the beacon signal is too low, the gateway will inform the satellite that there is a problem. In another embodiment, the gateway will transmit a beacon signal that will be monitored by the satellite, and when the strength of that beacon signal is too low, the satellite will know there is a problem requiring switching of the communication band between the satellite and the gateway. In another embodiment, the system (gateway, satellite, terrestrial weather monitoring system) can monitor weather patterns to detect heavy rains at the site of the gateway. Other techniques known in the art can be also be used for detecting problems with closing the communication link between the satellite and the gateway. In another embodiment, the system can choose to switch communication bands because of interference from other signal sources and if equipment used for the high capacity frequency band malfunctions.

If there is a problem closing a link (step 1010), then the system will switch communication between the satellite and the gateway to the low capacity frequency band without changing the frequency bands for the user terminals in step 1012. For example the user terminals can continue to operate using the frequency assignments of FIGS. 3A/3B or the user terminals can use the frequency assignments of FIGS. 7C/7D. Step 1014 includes operating the satellite communication system using the low capacity frequency band for communication between the satellite and the gateway while continuing to use the user band for communication with the user terminals. That is, the user terminals will operate according to FIGS. 3A/B or FIGS. 7C/7D. The gateways will communicate with the satellite as depicted in FIG. 2B (or FIG. 2C) by implementing the frequency assignments of FIGS. 4B-1 or 4B-2 (or FIGS. 4C-1 and 4C-2). Alternatively, step 1014 can also include the gateways communicating according to the frequency plan at FIG. 7A and FIG. 7B. When the problem with the communication link is solved (step 1016), the process will loop back to step 1004 and switch to the high capacity frequency band for communication between the satellite and the gateway. Until the problem is solved the system will continue operating in the low frequency band (loop back to step 1014).

One embodiment includes communicating with one or more gateways using a first frequency band while communicating with a set of the user terminals using a user frequency band in order to send information between the one or more gateways and the set of user terminals; communicating with the one or more gateways using a second frequency band while communicating with at least a subset of the user terminals using the user frequency band in order to send information between the one or more gateways and the subset of the user terminals, the second frequency band has a lower capacity than the first frequency band; and switching communicating with the one or more gateways between the first frequency band and the second frequency band to send information between the one or more gateways and the set of user terminals.

One embodiment includes providing a first communication path between a gateway and a plurality of user terminals via the satellite including communicating with the gateway using a first frequency band while communicating with the user terminals using a user frequency band; and providing a second communication path between the gateway and the plurality of user terminals via the satellite including communicating with the gateway using a second frequency band while communicating with at least a subset of the user terminals using the user frequency band, the second frequency band has a lower capacity than the first frequency band.

One embodiment includes an antenna system that communicates with a gateway and a plurality of user terminals; and a set of one or more frequency converters in communication with the antenna system, the one or more frequency converters are configured to provide a communication path between the gateway and the plurality of user terminals that includes communicating with the gateway using a first frequency band while communicating with the user terminals using a user frequency band to transmit data between the gateway and the user terminals, the one or more frequency converters are configured to switch communication with the gateway to a second frequency band while communicating with at least a subset of the user terminals using the user frequency band to transmit data between the gateway and the user terminals, the first frequency band has a higher capacity than the second frequency band.

One embodiment includes an antenna system that communicates with a gateway and a plurality of user terminals; a first set of one or more frequency converters configured to provide a first transmission path between the gateway and the user terminals that includes communicating with the gateway using a first frequency band while communicating with the user terminals using a user frequency band to transmit data between the gateway and the user terminals; and a second set of one or more frequency converters configured to provide a second transmission path between the gateway and the user terminals that includes communicating with the gateway using a second frequency band while communicating with the user terminals using the user frequency band to transmit data between the gateway and the user terminals, the first frequency band has a higher capacity than the second frequency band so that the first transmission path is higher in bandwidth than the second transmission path, the second transmission path is used in lieu of the first transmission path.

One embodiment includes a bus; and a payload carried by the bus, the payload is configured to provide a communication path between a gateway and a plurality of user terminals including communicating with the gateway using a first frequency band while communicating with the user terminals using a user frequency band, the payload is configured to adjust the communication path between the gateway and the plurality of user terminals to include communicating with the gateway using a second frequency band while communicating with at least a subset of the user terminals using the user frequency band, the second frequency band having a lower capacity than the first frequency band.

Note that for purposes of this document a connection can be a direct or indirect connection. Similarly, two components are in communication if they are directly connected or if they can communicate via one or more other components. Although the drawings show the steps in a particular order, that order is not required unless the discussion says it is or there is a technical reason requiring the order.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

What is claimed is:

1. A method of operating a satellite, comprising:
using a first frequency band for a feeder link between a gateway and the satellite while using a user frequency band for a user link between a set of user terminals and the satellite in order to send information between the gateway and the set of user terminals;
using a second frequency band for the feeder link between the gateway and the satellite while using the user frequency band for the user link between the subset of the user terminals and the satellite in order to send information between the gateway and the subset of the user terminals, the second frequency band has a lower capacity than the first frequency band;
in response to identifying a problem with the first frequency band, switching from using the first frequency band to using the second frequency band for the feeder link between the gateway and the satellite while using the user frequency band for the user link between the user terminals and the satellite; and
the using the first frequency band, the using the second frequency band and the switching are performed by the satellite.

2. The method of claim 1, wherein:
the first frequency band is at least one of a V band and a Q band;
the second frequency band is a Ka band; and
the user frequency band is the Ka band.

3. The method of claim 1, further comprising:
detecting rain fade, the switching is performed in response to detecting rain fade and the switching includes switching communicating with the gateway from a V band to a Ka band.

4. The method of claim 1, further comprising:
detecting a degradation in link quality, the switching is performed in response to detecting the degradation in link quality and the switching includes switching communicating with the gateway to the second frequency band without changing frequency band for the subset of user terminals, the communicating with the gateway using the second frequency band is performed in response to the switching.

5. The method of claim 1, wherein:
the switching communicating with the gateway decreases communication capacity of the satellite.

6. The method of claim 1, wherein:
the using the first frequency band for the feeder link between the gateway and the satellite includes providing communication for the set of user terminals; and
the using the second frequency band for the feeder link between the gateway and the satellite includes providing communication for only the subset of user terminals so that some user terminals are not serviced when communicating with one or more gateways using the second frequency band.

7. The method of claim 1, wherein:
the using the first frequency band for the feeder link between the gateway and the satellite includes providing communication for the set of user terminals; and
the using the second frequency band for the feeder link between the gateway and the satellite includes providing communication for the set of user terminals with at least a subset of the user terminals communicating at a lower capacity due to lower allocated bandwidth for the subset of user terminals.

8. The method of claim 7, further comprising:
switching frequencies within the user frequency band for communicating with at least the subset of the user terminals when switching communicating with the gateway between the first frequency band and the second frequency band.

9. The method of claim 1, further comprising:
using the second frequency band for the feeder link between the gateway and the satellite initially on deployment of the satellite;
performing an initial switching of the feeder link between the gateway and the satellite from the second frequency band to the first frequency band after a first period of time using the second frequency band; and
using the first frequency band for the feeder link between the gateway and the satellite in response to the initial switching.

10. The method of claim 9, further comprising:
detecting a degradation in link quality, the switching is also performed in response to detecting the degradation in link quality and the switching includes switching communicating with the gateway to the second frequency band.

11. The method of claim 1, wherein:
the switching comprises operating one or more switches to select a different input among at least a first input and second input, the first input is for communication in the first frequency band, the second input is for communication in the second frequency band, the output of the switch is transmitted to user terminals.

12. The method of claim 1, wherein:
the switching comprises operating one or more switches to select a different output among at least a first output and second output, the first output is for communication in the first frequency band, the second output is for communication in the second frequency band, the input of the switch includes signals received from user terminals.

13. The method of claim 1, wherein the switching comprises:
operating one or more switches to select a different input among at least a first input and second input, the first input is for communication in the first frequency band, the second input is for communication in the second frequency band, the output of the switch is transmitted to user terminals; and
operating one or more switches to select a different output among at least a first output and second output, the first output is for communication in a third frequency band, the second output is for communication in the second frequency band, the input of the switch includes signals received from user terminals.

14. A method of operating a satellite, comprising,
providing a communication path between a gateway and a plurality of user terminals via the satellite including using a first frequency band for a feeder link between a gateway and the satellite while using a user frequency band for a user link between a user terminal and the satellite;
testing the communication path to identify problems related to the first frequency band; and
in response to identifying a problem with the first frequency band switching from using the first frequency band to using a second frequency band for the feeder link between the gateway and the satellite while using the user frequency band for the user link between the user terminal and the satellite, the second frequency band has a lower capacity than the first frequency band.

15. The method of claim 14, wherein the testing includes: detecting a degradation in link quality; and
the switching includes switching from the first frequency to the second frequency in response to detecting the degradation in link quality.

16. A satellite, comprising:
an antenna system that communicates with a gateway and a plurality of user terminals; and
a set of one or more frequency converters in communication with the antenna system, the one or more frequency converters are configured to provide a communication path between the gateway and the plurality of user terminals that includes using a first frequency band for a feeder link between a gateway and the satellite while using a user frequency band for a user link between the user terminals and the satellite, the one or more frequency converters are configured to switch the feeder link between the gateway and the satellite from the first frequency band to a second frequency band while using the user frequency band for the user link between the user terminals and the satellite, the first frequency band has a higher capacity than the second frequency band; and
wherein the one or more frequency converters are configured to switch from the first frequency band to the second frequency band in response to a signal indicating a degradation in link quality.

17. The satellite of claim 16, further comprising:
a set of one or more receiving amplifiers in communication with the antenna system and the set of one or more frequency converters, the set of one or more receiving amplifiers receive uplink signals from the user terminals via the antenna system and provide the received uplink signals to the set of one or more frequency converters; and
a set of one or more output amplifiers in communication with the one or more frequency converters and the antenna system, the set of one or more output amplifiers receive downlink signals from the set of one or more frequency converters and provide the downlink signals to the antenna system for transmission to the gateway, the set of one or more frequency converters down convert frequencies of the received uplink signals to lower frequencies when communicating with the gateway using the second frequency band, the set of one or more frequency converters up convert frequencies of the received uplink signals to higher frequencies when communicating with the gateway using the first frequency band.

18. The satellite of claim 16, further comprising:
a set of one or more receiving amplifiers in communication with the antenna system and the set of one or more frequency converters, the set of one or more receiving amplifiers receive uplink signals from the gateway via the antenna system and provide the received uplink signals to the set of one or more frequency converters; and
a set of one or more output amplifiers in communication with the one or more frequency converters and the antenna system, the set of one or more output amplifiers receive downlink signals from the set of one or more frequency converters and provide the downlink signals to the antenna system for transmission to the user terminals, the set of one or more frequency converters down convert frequencies of the received uplink signals to lower frequencies when communicating with the gateway using the first frequency band and when communicating with the gateway using the second frequency band.

19. The satellite of claim 16, wherein:
the first frequency band is at least one of a V band and a Q band;
the second frequency band is a Ka band; and
the user frequency band is the Ka band.

20. The satellite of claim 16, wherein the one or more frequency converters comprise:
a first down converter configured to receive a first signal in the first frequency band;
a second down converter configured to receive a second signal in the second frequency band;
a switch having a first input, a second input and an output, the first input in communication with the first down converter, the second input in communication with the second down converter;
a filter in communication with the output; and
an output amplifier in communication with the filter.

21. The satellite of claim 16, wherein:
the one or more frequency converters are configured to switch communication with the subset of the user terminals to different frequencies in the user frequency band when the one or more frequency converters switch communication with the gateway to the second frequency band.

22. The satellite of claim 16, wherein:
the using the first frequency band for the feeder link between the gateway and the satellite includes providing communication for the plurality of user terminals; and
the using the second frequency band for the feeder link between the gateway and the satellite includes providing communication for only the subset of user terminals so that some user terminals are not serviced when communicating with the gateways using the second frequency band.

23. The satellite of claim 16, wherein:
the using the first frequency band for the feeder link between the gateway and the satellite includes providing communication for the plurality of user terminals; and
the using the second frequency band for the feeder link between the gateway and the satellite includes providing communication for the plurality of user terminals with at least the subset of the user terminals communicating at a lower capacity due to lower allocated bandwidth for the subset of user terminals.

24. A satellite, comprising,
a bus; and
a payload carried by the bus, the payload is configured to provide a communication path between a gateway and a plurality of user terminals including using a first frequency band for a feeder link between the gateway and the satellite while using a user frequency band for a user link between the user terminals and the satellite, the payload is configured to adjust the communication path between the gateway and the plurality of user terminals to include using a second frequency band for the feeder link between the gateway and the satellite while using the user frequency band for the user link between the user terminals and the satellite, the second frequency band having a lower capacity than the first frequency band.

25. A satellite, comprising:

an antenna system that communicates with a gateway and a plurality of user terminals;

a first set of one or more frequency converters configured to provide a first transmission path between the gateway and the user terminals that includes using a first frequency band for a feeder link between the gateway and the satellite while using a user frequency band for a user link between the user terminals and the satellite; and a second set of one or more frequency converters configured to provide a second transmission path between the gateway and the user terminals that includes using a second frequency band for the feeder link between the gateway and the satellite while using the user frequency band for the user link between the user terminal and the satellite, the first frequency band has a higher capacity than the second frequency band so that the first transmission path is higher in bandwidth than the second transmission path, the first transmission path is switched to the second transmission path when a problem is detected with the first transmission path.

* * * * *